United States Patent
Fan et al.

(10) Patent No.: US 12,418,957 B2
(45) Date of Patent: Sep. 16, 2025

(54) WIRELESS METHOD AND APPARATUS FOR IMPROVING COMMUNICATION RELIABILITY OF A TERMINAL DEVICE

(71) Applicant: HUAWEI TECHNOLOGIES CO., LTD., Shenzhen (CN)

(72) Inventors: Qiang Fan, Shanghai (CN); Jun Wang, Shanghai (CN); Wenjie Peng, Shanghai (CN); Xiangyu Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 459 days.

(21) Appl. No.: 17/953,752

(22) Filed: Sep. 27, 2022

(65) Prior Publication Data
US 2023/0026332 A1    Jan. 26, 2023

Related U.S. Application Data

(63) Continuation of application No. PCT/CN2021/086171, filed on Apr. 9, 2021.

(30) Foreign Application Priority Data

Apr. 10, 2020  (CN) .......................... 202010278539.9

(51) Int. Cl.
*H04W 76/28* (2018.01)
*H04L 5/00* (2006.01)
(Continued)

(52) U.S. Cl.
CPC .......... *H04W 76/28* (2018.02); *H04L 5/0098* (2013.01); *H04W 76/14* (2018.02); *H04W 76/15* (2018.02)

(58) Field of Classification Search
CPC ..... H04W 76/28; H04W 76/15; H04W 76/14; H04W 36/0083; H04W 52/02;
(Continued)

(56) References Cited

U.S. PATENT DOCUMENTS

2019/0289561 A1*  9/2019  Corley .................. H04W 24/02
2023/0371114 A1* 11/2023  Chen ..................... H04W 76/28
(Continued)

FOREIGN PATENT DOCUMENTS

CN          109891959 A      6/2019
EP            2863386 A1 *   4/2015 ............. G10L 19/00
(Continued)

OTHER PUBLICATIONS

Huawei et al, "Discussion on DFN offset", 3GPP TSG RAN WG2 Meeting #96 R2-167925, Nov. 18, 2016.
(Continued)

*Primary Examiner* — Mewale A Ambaye
(74) *Attorney, Agent, or Firm* — HAUPTMAN HAM, LLP

(57) ABSTRACT

A wireless communication method includes receiving, by a terminal device, first information sent by a network device. The first information includes a first offset. The first offset is a difference between a frame number of a first system frame and a frame number of a first direct frame. The first system frame and the first direct frame overlap in a time domain. The wireless communication method also includes determining, by the terminal device, the first direct frame based on at least one of the first offset or the frame number of the first system frame.

20 Claims, 9 Drawing Sheets

(51) Int. Cl.
*H04W 76/14* (2018.01)
*H04W 76/15* (2018.01)

(58) Field of Classification Search
CPC ...... H04W 4/40; H04W 92/18; H04L 5/0098; H04L 5/0091
See application file for complete search history.

(56) References Cited

U.S. PATENT DOCUMENTS

| | | | | |
|---|---|---|---|---|
| 2024/0015839 A1* | 1/2024 | Zhang | ............... | H04W 52/0235 |
| 2024/0064857 A1* | 2/2024 | Wang | .................... | H04W 76/10 |
| 2024/0357701 A1* | 10/2024 | Park | ..................... | H04W 72/04 |
| 2024/0414601 A1* | 12/2024 | Back | ..................... | H04W 76/14 |
| 2025/0008433 A1* | 1/2025 | Park | ..................... | H04W 76/28 |

FOREIGN PATENT DOCUMENTS

| | | |
|---|---|---|
| WO | 2018143854 A1 | 8/2018 |
| WO | 2019177848 A1 | 9/2019 |

OTHER PUBLICATIONS

3GPP TSG RAN Meeting #86, RP-193231,New WID on NR sidelink enhancement ,LG Electronics,Sitges, Spain, Dec. 9-12, 2019,total 6 pages.
International Search Report issued in corresponding International Application No. PCT/CN2021/086171, mailed Jul. 8, 2021, pp. 1-9.
Samsung, On D2D communication related to out-of-coverage UE with TX timing not from eNB. 3GPP TSG RAN WG1 #79, San Francisco, USA, Nov. 17 21, 2014, R1-144728, 5 pages.
Intel Corporation, V2X UE transmit timing requirements and procedures. 3GPP TSG-RAN WG4 Meeting #80bis, Ljubljana, Slovenia, Oct. 10-14, 2016, R4-167995, 5 pages.
Chinese Office Action issued in corresponding Chinese Application No. 202010278539.9, dated Nov. 11, 2023, pp. 1-21.

* cited by examiner

WIRELESS METHOD AND APPARATUS FOR IMPROVING COMMUNICATION RELIABILITY OF A TERMINAL DEVICE

CROSS-REFERENCE TO RELATED APPLICATION

This application is a continuation of International Application No. PCT/CN2021/086171, filed on Apr. 9, 2021, which claims priority to Chinese Patent Application No. 202010278539.9, filed on Apr. 10, 2020. The disclosures of the aforementioned applications are herein incorporated by reference in their entireties.

TECHNICAL FIELD

This application relates to the communications field, and more specifically, to a wireless communication method and a communication apparatus.

BACKGROUND

Vehicle to everything (V2X) is considered as one of fields having the most industry potential and the clearest market requirements in an internet of things system. Vehicle to everything features wide application space, large industry potential, and strong social benefits, and is of great significance to promote innovation and development of the automobile and information communication industry, build new models and new forms of automobile and transportation services, promote innovation and application of autonomous driving technologies, and improve transportation efficiency and safety.

Maintaining time synchronization is an important factor for ensuring reliable communication on a sidelink between two terminal devices. A plurality of types of sidelink synchronization sources are defined in a 5th generation (5G) mobile communication system, for example, a global navigation satellite system (GNSS), an access network device (for example, a gNB or an eNB), or a terminal device. The terminal device may determine, based on preconfigured information and a priority of a synchronization source, synchronization is specifically performed based on which type of synchronization source. However, because there are a plurality of types of synchronization sources, radio frame boundaries determined by a plurality of terminal devices may be the same or similar, but radio frame numbers at a same moment may be different. For some operations or configurations based on an accurate frame number (for example, DRX operations on a sidelink), communication quality may be affected because a receive device and a transmit device cannot reach a consistent understanding.

SUMMARY

This application provides a wireless communication method and a communication apparatus, to improve communication reliability of a terminal device.

According to a first aspect, a wireless communication method is provided. The method may be performed by a first terminal device or a module (such as a chip) disposed (or configured) in the first terminal device. The following uses an example in which the method is performed by the first terminal device for description.

The method includes: A first terminal device receives first information sent by a network device, where the first information includes a first offset, the first offset is a difference between a frame number of a first system frame and a frame number of a first direct frame, and the first system frame and the first direct frame partially or completely overlap in time domain. The first terminal device determines the first direct frame based on the first offset and/or the frame number of the first system frame.

According to the foregoing solution, a terminal device can accurately obtain a direct frame or a direct subframe used for sidelink communication. When the terminal device performs an operation based on an accurate direct frame, an accurate subframe, or the like during sidelink communication, terminal devices can have a consistent understanding, and communication reliability can be improved.

With reference to the first aspect, in some implementations of the first aspect, the first offset, the frame number of the first system frame, and the frame number of the first direct frame satisfy:

$$D_f = (N_{max} + 1 + S_f - \Delta 1) \bmod (N_{max} + 1), \text{ or}$$

$$D_f = (N_{max} + 1 + S_f + \Delta 1) \bmod (N_{max} + 1), \text{ where}$$

$D_f$ is the frame number of the first direct frame, $S_f$ is the frame number of the first system frame, $\Delta 1$ is the first offset, and $N_{max}$ is a maximum value of the frame number of the first direct frame.

According to the foregoing solution, a terminal device can accurately obtain a direct frame used for sidelink communication, and a direct frame number and/or a subframe number of a subframe in the direct frame. When the terminal device performs an operation based on an accurate direct frame number, an accurate subframe number of a direct frame, or the like during sidelink communication, terminal devices can have a consistent understanding, and communication reliability can be improved.

With reference to the first aspect, in some implementations of the first aspect, the method further includes: The first terminal device receives second information sent by the network device, where the second information is used to configure a discontinuous reception DRX operation on a sidelink of the first terminal device, and the second information is determined by the network device based on the frame number of the first system frame.

With reference to the first aspect, in some implementations of the first aspect, the method further includes: The first terminal device determines third information of the DRX operation based on the second information and the first offset, where the third information is configuration information of the DRX operation corresponding to the frame number of the first direct frame. The first terminal device sends the third information to a second terminal device, where the DRX operation is used by the first terminal device to send or receive a signal between the first terminal device and the second terminal device.

According to the foregoing solution, a terminal device can accurately obtain a direct frame used for sidelink communication, and a direct frame number and/or a subframe number of a subframe in the direct frame, and the terminal device can accurately obtain a frame number of a direct frame or a subframe number of a subframe in the direct frame, where the direct frame is corresponding to an activation time period of a DRX operation on a sidelink, so that communication reliability in the DRX operation can be improved.

According to a second aspect, a wireless communication method is provided. The method may be performed by a first terminal device or a module (such as a chip) disposed (or configured) in the first terminal device. The following uses an example in which the method is performed by the first terminal device for description.

The method includes: A first terminal device receives first information sent by a network device, where the first information includes a second offset, the second offset is a time offset between a first system frame and a second direct frame, and a frame number of the first system frame is the same as a frame number of the second direct frame. The first terminal device determines the second direct frame based on the second offset and/or the frame number of the first system frame.

According to the foregoing solution, a terminal device can accurately obtain a direct frame used for sidelink communication. When the terminal device performs an operation based on an accurate direct frame, an accurate subframe, or the like during sidelink communication, terminal devices can have a consistent understanding, and communication reliability can be improved.

With reference to the second aspect, in some implementations of the second aspect, a unit of the second offset is one or more of the following units: a frame, a subframe, a symbol, a millisecond ms, or a microsecond μs.

With reference to the second aspect, in some implementations of the second aspect, the second direct frame is specifically one of the following direct frames:

a closest direct frame that is earlier than or later than the first system frame in terms of time and whose frame number is the same as the frame number of the first system frame, or a direct frame that has a smallest time difference from the first system frame and that is in one or more direct frames whose frame number is the same as the frame number of the first system frame.

With reference to the second aspect, in some implementations of the second aspect, the method further includes: The first terminal device determines a frame number of a first direct frame based on the second offset and/or the frame number of the first system frame, where the first system frame and the first direct frame partially or completely overlap in time domain.

According to the foregoing solution, a terminal device can accurately obtain a direct frame and a direct frame number used for sidelink communication. When the terminal device performs an operation based on an accurate direct frame number during sidelink communication, terminal devices can have a consistent understanding, and communication reliability can be improved.

With reference to the second aspect, in some implementations of the second aspect, the second offset, the frame number of the first system frame, and the frame number of the first direct frame satisfy:

$$D_f = \lfloor N_{max} + 1 + S_f + (S_{sub} - \Delta 2)/N_{sub} \rfloor \mod (N_{max} + 1),$$
where mod represents obtaining a modulo value, $\lfloor \ \rfloor$ represents rounding down, $D_f$ is the frame number of the second direct frame, $S_f$ is the frame number of the first system frame, $S_{sub}$ is a subframe number of a first subframe in the first system frame, $N_{sub}$ is a total quantity of subframes included in each direct frame, $N_{max}$ is a maximum value of the frame number of the first direct frame, $\Delta 2$ is the second offset, and the unit of the second offset is the subframe or the millisecond.

With reference to the second aspect, in some implementations of the second aspect, the method further includes:

The first terminal device determines a subframe number of a second subframe in the first direct frame corresponding to the first subframe based on a first offset and a subframe number of the first subframe in the first system frame, where the first subframe and the second subframe partially or completely overlap in time domain.

According to the foregoing solution, a terminal device can accurately obtain a subframe number of a subframe in a direct frame used for sidelink communication. When the terminal device performs an operation based on an accurate subframe number of a subframe in a direct frame during sidelink communication, terminal devices can have a consistent understanding, and communication reliability can be improved.

With reference to the second aspect, in some implementations of the second aspect, the subframe number of the first subframe, the first offset, and the subframe number of the second subframe satisfy:

$$D_{sub} = (S_{sub} - \Delta 2 \mod N_{sub} + N_{sub}) \mod N_{sub}, \text{ where}$$

$D_{sub}$ is the subframe number of the second subframe, $S_{sub}$ is the subframe number of the first subframe in the first system frame, and $N_{sub}$ is the total quantity of subframes included in each direct frame.

With reference to the second aspect, in some implementations of the second aspect, the method further includes:

The first terminal device receives second information sent by the network device, where the second information is used to configure a discontinuous reception DRX operation on a sidelink of the first terminal device, and the second information is determined by the network device based on the frame number of the first system frame.

With reference to the second aspect, in some implementations of the second aspect, the method further includes:

The first terminal device determines third information of the DRX operation based on the second information and the second offset, where the third information is configuration information of the DRX operation corresponding to the frame number of the first direct frame.

The first terminal device sends the third information to a second terminal device, where the DRX operation is used by the first terminal device to send or receive a signal between the first terminal device and the second terminal device.

According to the foregoing solution, a terminal device can accurately obtain a direct frame used for sidelink communication, and a direct frame number and/or a subframe number of a subframe in the direct frame, and the terminal device can accurately obtain a frame number of a direct frame or a subframe number of a subframe in the direct frame, where the direct frame is corresponding to an activation time period of a DRX operation on a sidelink, so that communication reliability in the DRX operation can be improved.

According to a third aspect, a wireless communication method is provided. The method may be performed by a first terminal device or a module (such as a chip) disposed (or configured) in the first terminal device. The following uses an example in which the method is performed by the first terminal device for description.

The method includes: The first terminal device receives fourth information, where the fourth information includes a first time point.

The first terminal device determines a frame number of a first direct frame and/or a subframe number of a second subframe based on the first time point.

For example, a direct frame is a radio frame used by the first terminal device to perform sidelink communication, the direct frame includes the first direct frame, the second subframe is a subframe in the first direct frame, the first time point is a time point corresponding to a first reference point in a system frame in a network device, and the first direct frame is a direct frame corresponding to the first reference point, or the second subframe is a subframe in the direct frame corresponding to the first reference point.

According to the foregoing solution, a terminal device can accurately obtain a direct frame used for sidelink communication, and a direct frame number and/or a subframe number of a subframe in the direct frame. When the terminal device performs an operation based on an accurate direct frame, an accurate subframe, or the like during sidelink communication, terminal devices can have a consistent understanding, and communication reliability can be improved.

With reference to the third aspect, in some implementations of the third aspect, the fourth information is carried in a system information block or an RRC message sent by the network device.

With reference to the third aspect, in some implementations of the third aspect, the first time point is a time point of coordinated universal time UTC time or a time point of global positioning system GPS time.

According to the foregoing solution, a terminal device can accurately obtain, based on UTC time, a direct frame used for sidelink communication, and a direct frame number and/or a subframe number of a subframe in the direct frame. When the terminal device performs an operation based on an accurate direct frame, an accurate subframe, or the like during sidelink communication, terminal devices can have a consistent understanding, and communication reliability can be improved.

With reference to the third aspect, in some implementations of the third aspect, the fourth information further includes a third offset, and the third offset is a time offset between the coordinated universal time UTC time and the GPS time.

According to the foregoing solution, a terminal device can accurately obtain, based on corresponding UTC time calculated through GPS time, a direct frame used for sidelink communication, and a direct frame number and/or a subframe number of a subframe in the direct frame. When the terminal device performs an operation based on an accurate direct frame, an accurate subframe, or the like during sidelink communication, terminal devices can have a consistent understanding, and communication reliability can be improved.

With reference to the third aspect, in some implementations of the third aspect, a unit of the first time point is one or more of the following units: a millisecond, a microsecond, or a nanosecond.

With reference to the third aspect, in some implementations of the third aspect, the first reference point is one of the following reference points:

a reference point preset by a system, predefined in a protocol, or configured by the network device;

a reference point in a first system frame in which the fourth information is sent; or a reference point in a first subframe in which the fourth information is sent, where the first subframe is a subframe in the first system frame.

According to a fourth aspect, a wireless communication method is provided. The method may be performed by a first terminal device or a module (such as a chip) disposed (or configured) in the first terminal device. The following uses an example in which the method is performed by the first terminal device for description.

The method includes: A first terminal device receives fourth information, where the fourth information includes a frame number of a first direct frame or a subframe number of a second subframe. The first terminal device determines the frame number of the first direct frame and/or the subframe number of the second subframe based on the fourth information. For example, a direct frame is a radio frame used by the first terminal device to perform sidelink communication, the direct frame includes the first direct frame, the second subframe is a subframe in the first direct frame, a first time point is a time point corresponding to a first reference point in a system frame in a network device, and the first direct frame is a direct frame corresponding to the first reference point, or the second subframe is a subframe in the direct frame corresponding to the first reference point.

According to the foregoing solution, a terminal device can obtain, based on fourth information, a direct frame used for sidelink communication, and a direct frame number and/or a subframe number of a subframe in the direct frame. When the terminal device performs an operation based on an accurate direct frame, an accurate subframe, or the like during sidelink communication, terminal devices can have a consistent understanding, and communication reliability can be improved.

With reference to the fourth aspect, in some implementations of the fourth aspect, the fourth information is carried in a system information block or an RRC message sent by the network device.

According to the foregoing solution, a terminal device can obtain, based on fourth information received from a network device, a direct frame used for sidelink communication, and a direct frame number and/or a subframe number of a subframe in the direct frame. When the terminal device performs an operation based on an accurate direct frame, an accurate subframe, or the like during sidelink communication, terminal devices can have a consistent understanding, and communication reliability can be improved.

With reference to the fourth aspect, in some implementations of the fourth aspect, the fourth information is carried in one or more of an RRC message, MAC CE signaling, or SCI sent by a second terminal device.

According to the foregoing solution, a terminal device can obtain, based on fourth information received from another terminal device, a direct frame used for sidelink communication, and a direct frame number and/or a subframe number of a subframe in the direct frame. When the terminal device performs an operation based on an accurate direct frame, an accurate subframe, or the like during sidelink communication, terminal devices can have a consistent understanding, and communication reliability can be improved.

With reference to the fourth aspect, in some implementations of the fourth aspect, when the fourth information is carried in the RRC message, the first direct frame is specifically a direct frame in which the RRC message is initially transmitted, and/or the second subframe is specifically a direct subframe in which the RRC message is initially transmitted. Alternatively, when the fourth information is carried in the MAC CE signaling, the first direct frame is specifically a direct frame in which the MAC CE is initially transmitted, and/or the second subframe is specifically a direct subframe in which the MAC CE is initially transmitted. Alternatively, when the fourth information is carried in the SCI, the first direct frame is a direct frame carrying the SCI, and the second subframe is a direct subframe carrying the SCI.

According to the foregoing solution, due to impact of a channel condition, the first terminal device fails to receive the RRC message or the MAC CE when the RRC message or the MAC CE is initially transmitted, but successfully receives the RRC message or the MAC CE when the RRC message or the MAC CE is retransmitted (or referred to as retransmission). It is specified that, regardless of initial transmission or retransmission, the fourth information in the RRC message or the MAC CE indicates related information about the first direct frame or the second subframe used during initial transmission. In this way, a transmit end does not need to reassemble a packet for sending, to reduce implementation complexity.

With reference to the third aspect or the fourth aspect, in some implementations of the third aspect or the fourth aspect, the first terminal device sends fifth information, where the fifth information indicates that the first terminal device successfully receives the fourth information or fails to receive the fourth information.

With reference to one aspect of the first aspect to the fourth aspect, in some implementations of the aspect of the first aspect to the fourth aspect, the method further includes: The first terminal device sends a synchronization signal block on a sidelink, where a radio frame number indicated by the synchronization signal block is the frame number of the first direct frame, and/or a radio subframe number indicated by the synchronization signal block is the subframe number of the second subframe.

According to the foregoing solution, the first terminal device indicates the direct frame number and/or the subframe number of the second subframe by sending the synchronization signal block on the sidelink. In this way, another terminal device can also obtain a direct frame used for sidelink communication, and a direct frame number and/or a subframe number of a subframe in the direct frame, to implement that understandings between terminal devices are consistent, and to ensure sidelink communication reliability.

With reference to one aspect of the first aspect to the fourth aspect, in the aspect of the first aspect to the fourth aspect, a master information block in the synchronization signal block includes an indicator field, and the indicator field indicates whether related information about a radio frame indicated by the synchronization signal block is related information about the first direct frame. The related information includes one or more of the frame number of the first direct frame, the subframe number of the second subframe, or a number of a first slot.

According to a fifth aspect, a wireless communication method is provided. The method may be performed by a network device or a module (such as a chip) disposed (or configured) in the network device. The following uses an example in which the method is performed by the network device for description.

The method includes: A network device determines a first offset, where the first offset is a difference between a frame number of a first system frame and a frame number of a first direct frame, and the first system frame and the second direct frame partially or completely overlap in time domain. The network device sends first information to a first terminal device, where the first information includes the first offset.

According to a sixth aspect, a wireless communication method is provided. The method may be performed by a network device or a module (such as a chip) disposed (or configured) in the network device. The following uses an example in which the method is performed by the network device for description.

The method includes: A network device determines a second offset, where the second offset is a time offset between a first system frame and a second direct frame, and a frame number of the first system frame is the same as a frame number of the second direct frame.

The network device sends first information to a first terminal device, where the first information includes the second offset.

With reference to the sixth aspect, in some implementations of the sixth aspect, a unit of the first offset is one or more of the following units: a frame, a subframe, a symbol, a millisecond ms, or a microsecond µs.

With reference to the sixth aspect, in some implementations of the sixth aspect, the second direct frame is specifically one of the following direct frames:

a closest direct frame that is earlier than or later than the first system frame in terms of time and whose frame number is the same as the frame number of the first system frame, or a direct frame that has a smallest time difference from the first system frame and that is in one or more direct frames whose frame number is the same as the frame number of the first system frame.

With reference to the fifth aspect or the sixth aspect, in some implementations of the fifth aspect or the sixth aspect, the method further includes: The network device sends second information to the first terminal device, where the second information is used to configure discontinuous reception on a sidelink of the first terminal device, and the second information is determined by the network device based on the frame number of the first system frame.

According to a seventh aspect, a wireless communication method is provided. The method may be performed by a second terminal device or a module (such as a chip) disposed (or configured) in the second terminal device. The following uses an example in which the method is performed by the second terminal device for description.

The method includes: A second terminal device receives a synchronization signal block that is on a sidelink and that is sent by a first terminal device, where a radio frame number indicated by the synchronization signal block is a frame number of a first direct frame, and/or a radio subframe number indicated by the synchronization signal block is a subframe number of a second subframe. The second terminal device determines the first direct frame and/or the second subframe based on the synchronization signal block.

With reference to the seventh aspect, in some implementations of the seventh aspect, a master information block in the synchronization signal block includes an indicator field, and the indicator field indicates that related information about a radio frame indicated by the synchronization signal block is related information about the first direct frame.

With reference to the seventh aspect, in some implementations of the seventh aspect, the indicator field indicates whether the related information about the radio frame indicated by the synchronization signal block is the related information about the first direct frame, and the related information includes one or more of the frame number of the first direct frame, the subframe number of the second subframe, or a number of a first slot.

According to an eighth aspect, a communication apparatus is provided, where the communication apparatus is a first terminal device or a module (such as a chip) disposed (or configured) in the first terminal device, and includes: a transceiver unit, configured to receive first information sent by a network device, where the first information includes a first offset, the first offset is a difference between a frame number of a first system frame and a frame number of a first direct frame, and the first system frame and the first direct frame partially or completely overlap in time domain; and a processing unit, configured to determine the first direct frame based on the first offset and/or the frame number of the first system frame.

With reference to the eighth aspect, in some implementations of the eighth aspect, the first offset, the frame number of the first system frame, and the frame number of the first direct frame satisfy:

$$D_f=(N_{max}+1+S_f-\Delta 1) \mod (N_{max}+1), \text{ or}$$

$$D_f=(N_{max}+1+S_f+\Delta T) \mod (N_{max}+1), \text{ where}$$

$D_f$ is the frame number of the first direct frame, $S_f$ is the frame number of the first system frame, $\Delta 1$ is the first offset, and $N_{max}$ is a maximum value of the frame number of the first direct frame.

With reference to the eighth aspect, in some implementations of the eighth aspect, the transceiver unit is further configured to receive second information sent by the network device, where the second information is used to configure a discontinuous reception DRX operation on a sidelink of the communication apparatus, and the second information is determined by the network device based on the frame number of the first system frame.

With reference to the eighth aspect, in some implementations of the eighth aspect, the processing unit is further configured to determine third information of the DRX operation based on the second information and the first offset, where the third information is configuration information of the DRX operation corresponding to the frame number of the first direct frame. The transceiver unit is further configured to send the third information to a second terminal device, where the DRX operation is used by the communication apparatus to send or receive a signal between the communication apparatus and the second terminal device.

According to a ninth aspect, a communication apparatus is provided, where the communication apparatus is a first terminal device or a module (such as a chip) disposed (or configured) in the first terminal device, and includes: a transceiver unit, configured to receive first information sent by a network device, where the first information includes a second offset, the second offset is a time offset between a first system frame and a second direct frame, and a frame number of the first system frame is the same as a frame number of the second direct frame; and a processing unit, configured to determine the second direct frame based on the second offset and/or the frame number of the first system frame.

With reference to the ninth aspect, in some implementations of the ninth aspect, a unit of the second offset is one or more of the following units: a frame, a subframe, a symbol, a millisecond ms, or a microsecond µs.

With reference to the ninth aspect, in some implementations of the ninth aspect, the second direct frame is specifically one of the following direct frames:

a closest direct frame that is earlier than or later than the first system frame in terms of time and whose frame number is the same as the frame number of the first system frame, or a direct frame that has a smallest time difference from the first system frame and that is in one or more direct frames whose frame number is the same as the frame number of the first system frame.

With reference to the ninth aspect, in some implementations of the ninth aspect, the method further includes: The processing unit is further configured to determine a frame number of a first direct frame based on the second offset and/or the frame number of the first system frame, where the first system frame and the first direct frame partially or completely overlap in time domain.

According to the foregoing solution, a terminal device can accurately obtain a direct frame and a direct frame number used for sidelink communication. When the terminal device performs an operation based on an accurate direct frame number during sidelink communication, terminal devices can have a consistent understanding, and communication reliability can be improved.

With reference to the ninth aspect, in some implementations of the ninth aspect, the second offset, the frame number of the first system frame, and the frame number of the first direct frame satisfy:

$$D_f = \lfloor N_{max}+1+S_f+(S_{sub}-\Delta 2)/N_{sub} \rfloor \mod (N_{max}+1),$$
where mod represents obtaining a modulo value, $\lfloor \ \rfloor$ represents rounding down, $D_f$ is the frame number of the second direct frame, $S_f$ is the frame number of the first system frame, $S_{sub}$ is a subframe number of a first subframe in the first system frame, $N_{sub}$ is a total quantity of subframes included in each direct frame, $N_{max}$ is a maximum value of the frame number of the first direct frame, $\Delta 2$ is the second offset, and the unit of the second offset is the subframe or the millisecond.

With reference to the ninth aspect, in some implementations of the ninth aspect, the processing unit is further configured to determine a subframe number of a second subframe in the first direct frame corresponding to the first subframe based on a first offset and the subframe number of the first subframe in the first system frame. The first subframe and the second subframe partially or completely overlap in time domain.

With reference to the ninth aspect, in some implementations of the ninth aspect, the subframe number of the first subframe, the first offset, and the subframe number of the second subframe satisfy:

$$D_{sub}=(S_{sub}-\Delta 2 \mod N_{sub}+N_{sub}) \mod N_{sub}, \text{ where}$$

$D_{sub}$ is the subframe number of the second subframe, $S_{sub}$ is the subframe number of the first subframe in the first system frame, and $N_{sub}$ is the total quantity of subframes included in each direct frame.

With reference to the ninth aspect, in some implementations of the ninth aspect, the transceiver unit is further configured to receive second information sent by the network device, where the second information is used to configure a discontinuous reception DRX operation on a sidelink of the communication device, and the second information is determined by the network device based on the frame number of the first system frame.

With reference to the ninth aspect, in some implementations of the ninth aspect, the processing unit is further configured to determine third information of the DRX operation based on the second information and the second offset, where the third information is configuration information of the DRX operation corresponding to the frame number of the first direct frame. The transceiver unit is further configured to send the third information to a second terminal device, where the DRX operation is used by the communication apparatus to send or receive a signal between the communication apparatus and the second terminal device.

According to a tenth aspect, a communication apparatus is provided, where the communication apparatus is a first terminal device or a module (such as a chip) disposed (or configured) in the first terminal device, and includes: a transceiver unit, configured to receive fourth information, where the fourth information includes a first time point; and a processing unit, configured to determine a frame number of a first direct frame and/or a subframe number of a second subframe based on the first time point.

For example, a direct frame is a radio frame used by the first terminal device to perform sidelink communication, the direct frame includes the first direct frame, the second subframe is a subframe in the first direct frame, the first time point is a time point corresponding to a first reference point in a system frame in a network device, and the first direct frame is a direct frame corresponding to the first reference point, or the second subframe is a subframe in the direct frame corresponding to the first reference point.

With reference to the tenth aspect, in some implementations of the tenth aspect, the fourth information is carried in a system information block or an RRC message sent by the network device.

With reference to the tenth aspect, in some implementations of the tenth aspect, the first time point is a time point of coordinated universal time UTC time or a time point of global positioning system GPS time.

With reference to the tenth aspect, in some implementations of the tenth aspect, the fourth information further includes a third offset, and the third offset is a time offset between the coordinated universal time UTC time and the GPS time.

With reference to the tenth aspect, in some implementations of the tenth aspect, a unit of the first time point is one or more of the following units: a millisecond, a microsecond, or a nanosecond.

With reference to the tenth aspect, in some implementations of the tenth aspect, the first reference point is one of the following reference points:

a reference point preset by a system, predefined in a protocol, or configured by the network device;

a reference point in a first system frame in which the fourth information is sent; or a reference point in a first subframe in which the fourth information is sent, where the first subframe is a subframe in the first system frame.

According to an eleventh aspect, a communication apparatus is provided, where the communication apparatus is a first terminal device or a module (such as a chip) disposed (or configured) in the first terminal device, and includes: a transceiver unit, configured to receive fourth information, where the fourth information includes a frame number of a first direct frame or a subframe number of a second subframe; and a processing unit, configured to determine the frame number of the first direct frame and/or the subframe number of the second subframe based on the fourth information. For example, a direct frame is a radio frame used by the first terminal device to perform sidelink communication, the direct frame includes the first direct frame, the second subframe is a subframe in the first direct frame, a first time point is a time point corresponding to a first reference point in a system frame in a network device, and the first direct frame is a direct frame corresponding to the first reference point, or the second subframe is a subframe in the direct frame corresponding to the first reference point.

With reference to the eleventh aspect, in some implementations of the eleventh aspect, the fourth information is carried in a system information block or an RRC message sent by the network device.

With reference to the eleventh aspect, in some implementations of the eleventh aspect, the fourth information is carried in one or more of an RRC message, MAC CE signaling, or SCI sent by a second terminal device.

With reference to the eleventh aspect, in some implementations of the eleventh aspect, when the fourth information is carried in the RRC message, the first direct frame is specifically a direct frame in which the RRC message is initially transmitted, and/or the second subframe is specifically a direct subframe in which the RRC message is initially transmitted. Alternatively, when the fourth information is carried in the MAC CE signaling, the first direct frame is specifically a direct frame in which the MAC CE is initially transmitted, and/or the second subframe is specifically a direct subframe in which the MAC CE is initially transmitted. Alternatively, when the fourth information is carried in the SCI, the first direct frame is a direct frame carrying the SCI, and the second subframe is a direct subframe carrying the SCI.

With reference to the tenth aspect or the eleventh aspect, in some implementations of the third aspect or the fourth aspect, the transceiver unit sends fifth information, where the fifth information indicates that the first terminal device successfully receives the fourth information or fails to receive the fourth information.

With reference to one aspect of the eighth aspect to the eleventh aspect, in some implementations of the aspect of the eighth aspect to the eleventh aspect, the method further includes: The transceiver unit is further configured to send a synchronization signal block on a sidelink, where a radio frame number indicated by the synchronization signal block is the frame number of the first direct frame, and/or a radio subframe number indicated by the synchronization signal block is the subframe number of the second subframe.

With reference to one aspect of the eighth aspect to the eleventh aspect, in the aspect of the eighth aspect to the eleventh aspect, a master information block in the synchronization signal block includes an indicator field, and the indicator field indicates whether related information about a radio frame indicated by the synchronization signal block is related information about the first direct frame. The related information includes one or more of the frame number of the first direct frame, the subframe number of the second subframe, or a number of a first slot.

According to a twelfth aspect, a communication apparatus is provided, where the communication apparatus is a network device or a module (such as a chip) disposed (or configured) in the network device, and includes: a processing unit, configured to determine a first offset, where the first offset is a difference between a frame number of a first system frame and a frame number of a first direct frame, and the first system frame and the second direct frame partially or completely overlap in time domain; and a transceiver unit, configured to send first information to a first terminal device, where the first information includes the first offset.

According to a thirteenth aspect, a communication apparatus is provided, where the communication apparatus is a network device or a module (such as a chip) disposed (or configured) in the network device, and includes: a processing unit, configured to determine a second offset, where the second offset is a time offset between a first system frame and a second direct frame, and a frame number of the first system frame is the same as a frame number of the second direct frame; and a transceiver unit, configured to send first information to a first terminal device, where the first information includes the second offset.

With reference to the thirteenth aspect, in some implementations of the thirteenth aspect, a unit of the first offset is one or more of the following units: a frame, a subframe, a symbol, a millisecond ms, or a microsecond µs.

With reference to the thirteenth aspect, in some implementations of the thirteenth aspect, the second direct frame is specifically one of the following direct frames:

a closest direct frame that is earlier than or later than the first system frame in terms of time and whose frame number is the same as the frame number of the first system frame, or a direct frame that has a smallest time difference from the first system frame and that is in one or more direct frames whose frame number is the same as the frame number of the first system frame.

With reference to the twelfth aspect or the thirteenth aspect, in some implementations of the twelfth aspect or the thirteenth aspect, the transceiver unit is further configured to send second information to the first terminal device, where the second information is used to configure discontinuous reception on a sidelink of the first terminal device, and the second information is determined by the network device based on the frame number of the first system frame.

According to a fourteenth aspect, a communication apparatus is provided, where the communication apparatus is a second terminal device or a module (such as a chip) disposed (or configured) in the second terminal device, and includes: a transceiver unit, configured to receive a synchronization signal block that is on a sidelink and that is sent by a first terminal device, where a radio frame number indicated by the synchronization signal block is a frame number of a first direct frame, and/or a radio subframe number indicated by the synchronization signal block is a subframe number of a second subframe; and a processing unit, configured to determine the first direct frame and/or the second subframe based on the synchronization signal block.

With reference to the fourteenth aspect, in some implementations of the fourteenth aspect, a master information block in the synchronization signal block includes an indicator field, and the indicator field indicates that related information about a radio frame indicated by the synchronization signal block is related information about the first direct frame.

With reference to the fourteenth aspect, in some implementations of the fourteenth aspect, the indicator field indicates whether the related information about the radio frame indicated by the synchronization signal block is the related information about the first direct frame, and the related information includes one or more of the frame number of the first direct frame, the subframe number of the second subframe, or a number of a first slot.

According to a fifteenth aspect, a communication apparatus is provided, including a processor. The processor is coupled to a memory, and may be configured to perform the method in any one of the first aspect to the fourth aspect, and the possible implementations of the first aspect to the fourth aspect. Optionally, the communication apparatus further includes the memory. Optionally, the communication apparatus further includes a communication interface, and the processor is coupled to the communication interface.

In an implementation, the communication apparatus is a first terminal device. When the communication apparatus is the first terminal device, the communication interface may be a transceiver or an input/output interface.

In another implementation, the communication apparatus is a chip disposed in the first terminal device. When the communication apparatus is the chip disposed in the first terminal device, the communication interface may be the input/output interface.

Optionally, the transceiver may be a transceiver circuit. Optionally, the input/output interface may be an input/output circuit.

According to a sixteenth aspect, a communication apparatus is provided, including a processor. The processor is coupled to a memory, and may be configured to execute instructions in the memory, to implement the method in any one of the fifth aspect or the sixth aspect, and the possible implementations of the fifth aspect or the sixth aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip disposed in the network device. When the communication apparatus is the chip disposed in the network device, the communication interface may be the input/output interface.

Optionally, the transceiver may be a transceiver circuit. Optionally, the input/output interface may be an input/output circuit.

According to a seventeenth aspect, a communication apparatus is provided, including a processor. The processor is coupled to a memory, and may be configured to execute instructions in the memory, to implement the method in any one of the seventh aspect and the possible implementations of the seventh aspect. Optionally, the communication apparatus further includes the memory. Optionally, the communication apparatus further includes a communication interface, and the processor is coupled to the communication interface.

In an implementation, the communication apparatus is a second terminal device. When the communication apparatus is the second terminal device, the communication interface may be a transceiver or an input/output interface.

In another implementation, the communication apparatus is a chip disposed in the second terminal device. When the communication apparatus is the chip disposed in the second terminal device, the communication interface may be the input/output interface.

Optionally, the transceiver may be a transceiver circuit. Optionally, the input/output interface may be an input/output circuit.

According to an eighteenth aspect, a processor is provided, including an input circuit, an output circuit, and a processing circuit. The processing circuit is configured to receive a signal by using the input circuit, and transmit a signal by using the output circuit, so that the processor performs the method in any one of the first aspect to the seventh aspect, and the possible implementations of the first aspect to the seventh aspect.

In a specific implementation process, the processor may be one or more chips, the input circuit may be an input pin, the output circuit may be an output pin, and the processing circuit may be a transistor, a gate circuit, a trigger, any type of logic circuit, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, where the circuit is used as the input circuit and the output circuit respectively at different moments. Specific implementations of a processor and various circuits are not limited in embodiments of this application.

According to a nineteenth aspect, a processing apparatus is provided, including a processor and a memory. The processor is configured to read instructions stored in the memory, and may receive a signal by using a receiver, and transmit a signal by using a transmitter, to perform the method in any one of the first aspect to the seventh aspect, and the possible implementations of the first aspect to the seventh aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (ROM). The memory and the processor may be integrated on a same chip, or may be respectively disposed on different chips. A type of the memory and a manner of disposing the memory and the processor are not limited in embodiments of this application.

It should be understood that, for a related data exchange process, for example, sending indication information may be a process of outputting the indication information from the processor, and receiving capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the nineteenth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a twentieth aspect, a computer program product is provided. The computer program product includes a computer program (which may also be referred to as code or instructions). When the computer program is run, a computer is enabled to perform the method in any one of the first aspect to the seventh aspect, and the possible implementations of the first aspect to the seventh aspect.

According to a twenty-first aspect, a computer-readable storage medium is provided. The computer-readable medium stores a computer program (which may also be referred to as code or instructions). When the computer program is run on a computer, the computer is enabled to perform the method in any one of the first aspect to the seventh aspect, and the possible implementations of the first aspect to the seventh aspect.

According to a twenty-second aspect, a communication system is provided, where the communication system includes at least one of the foregoing first terminal device, second terminal device, or network device.

DESCRIPTION OF EMBODIMENTS

The following describes technical solutions in this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5G system, a new radio (NR) system, a vehicle-to-X (V2X) device, a long term evolution-vehicle (LTE-V) system, a vehicle-to-everything system, a machine type communication (MTC) system, an internet of things (IoT) system, a long term evolution-machine (long term evolution-machine, LTE-M) system, a machine to machine (M2M) system, a non-terrestrial communication (NTN) system, and another future evolved communication system, where V2X may include vehicle-to-network (V2N), vehicle-to-vehicle (V2V), vehicle-to-infrastructure (V2I), and vehicle-to-pedestrian (V2P).

Figure 1:
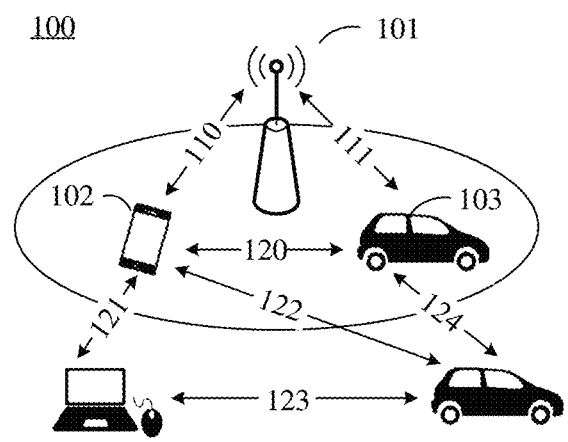
FIG. 1 is a schematic diagram of an architecture of a communication system applicable to an embodiment of this application.

FIG. 1 is a schematic diagram of a communication system 100 applicable to an embodiment of this application.

The communication system applicable to this embodiment of this application may include at least two terminal devices, for example, terminal devices 102, 103, 104, and 105 in the communication system 100 shown in FIG. 1. The communication system applicable to this embodiment of this application may further include at least one network device, for example, a network device 101 in the wireless communication system 100 shown in FIG. 1. A sidelink (SL) may be established between the at least two terminal devices, for example, links 120, 121, 122, 123, and 124 in FIG. 1. The terminal devices that establish the sidelink may directly communicate with each other.

The terminal device in this embodiment of this application may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in this embodiment of this application may be a mobile phone (mobile phone), a tablet computer (tablet computer), a computer having a wireless transceiver function, a virtual reality (VR) terminal device, an augmented reality (AR) terminal device, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (SIP) phone, a wireless local loop (wireless local loop, WLL) station, a personal digital assistant (PDA), a handheld device or a computing device that has a wireless communication function, another processing device connected to a wireless modem, a vehicle-mounted device, an in-vehicle communication apparatus, an in-vehicle communication processing chip, a wearable device, a terminal device in a 5G network, a terminal device in a future evolved public land mobile communication network (PLMN), or the like.

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device. Moreover, the wearable device implements powerful functions through software support, data exchange, and cloud interaction. In a broad sense, a wearable intelligent device includes a full-featured and large-sized device that can implement complete or partial functions without depending on a smartphone, such as a smart watch or smart glasses, and a device that focuses on only one type of application function and needs to work with another device such as a smartphone, such as various smart bands or smart jewelry for monitoring physical signs.

In addition, the terminal device may alternatively be a terminal device in an internet of things (IoT) system. The IoT is an important part of information technology development. A main technical feature of the IoT is to connect objects to a network by using a communication technology, to implement an intelligent network of man-machine interconnection and thing-to-thing interconnection.

It should be understood that a specific form of the terminal device is not limited in this application.

The technical solutions in embodiments of this application may be further applied to a network device. The network device includes but is not limited to: an evolved NodeB (eNB), a radio network controller (RNC), a road side unit (RSU), a NodeB (NB), a base station controller (BSC), abase transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like, may be a gNB or a transmission point (TRP or TP) in a 5G (such as NR) system, one antenna panel or a group of antenna panels (including a plurality of antenna panels) of a base station in a 5G system, or may be a network node included by a gNB or a transmission point, for example, a baseband unit (BBU) or a distributed unit (DU). Alternatively, the network device may be a network side apparatus that provides a communication service or communication control for a terminal device in vehicle-to-everything.

In some deployments, the gNB may include a centralized unit (CU) and the DU. The gNB may further include an active antenna unit (active antenna unit, AAU for short). The CU implements a part of functions of the gNB, and the DU implements a part of functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements a part of physical layer processing functions, radio frequency processing, and a function related to an active antenna. Information at the RRC layer finally becomes information at the PHY layer, or is converted from information at the PHY layer. Therefore, in this architecture, higher layer signaling such as RRC layer signaling may also be considered to be sent by the DU, or sent by the DU and the AAU. It may be understood that the network device may be a device including one or more of a CU node, a DU node, and an AAU node. In addition, the CU may be classified into a network device in an access network (AN), or the CU may be classified into a network device in a core network (CN). This is not limited in this application.

Figure 2:
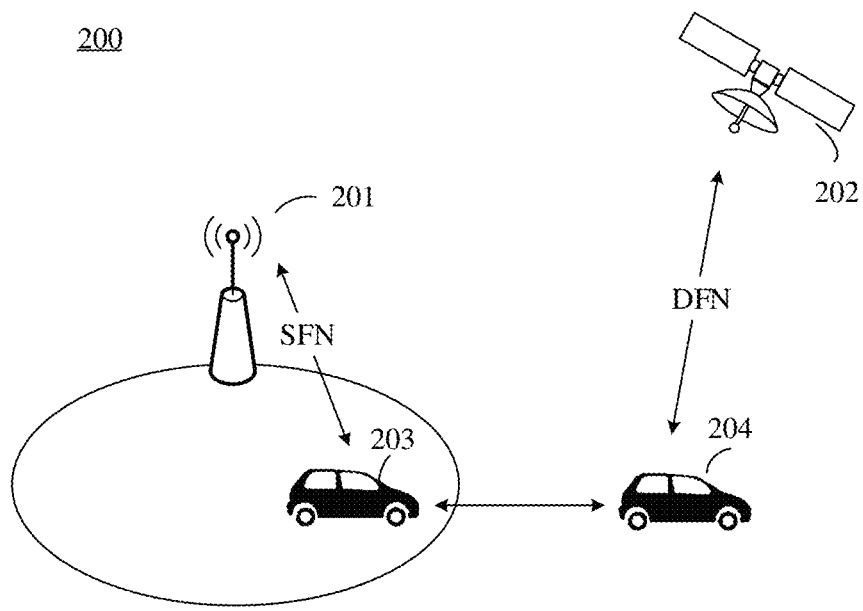
FIG. 2 is a schematic diagram of determining a radio frame according to an embodiment of this application.
Figure 3:
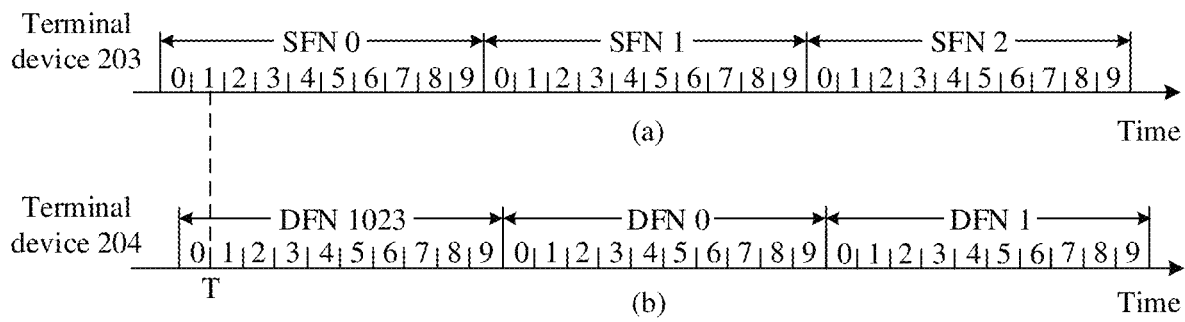
FIG. 3 is another schematic diagram of determining a radio frame according to an embodiment of this application.

For example, as shown in FIG. 2, a terminal device (for example, a terminal device 203) may use a network device 201 (for example, a gNB or an eNB) as a synchronization source to synchronize with the network device 201, and obtain a system frame number (SFN) in the network device and a subframe or a number of a slot (slot) in a corresponding system frame, as shown in (a) in FIG. 3. Alternatively, a terminal device (for example, a terminal device 204) may use a GNSS device as the synchronization source, determine a direct frame by using coordinated universal time (UTC) indicated by the GNSS device, and obtain a corresponding direct frame number (DFN) and a subframe or a number of a slot in the direct frame, as shown in (b) in FIG. 3. A frame boundary of the system frame determined by the terminal device 203 is the same as or similar to a frame boundary of a direct frame determined by the terminal device 204, but frame numbers of corresponding radio frames at a same moment may be different. For example, at a moment T, the frame number of the radio frame (namely, the system frame in the network device 201) determined by the terminal device 203 is 0, but the frame number of the radio frame (namely, the direct frame determined by using the UTC time) determined by the terminal device 204 is 1023. In this case, when an operation or configuration based on an accurate frame number is performed between the terminal devices 203 and 204, communication quality may be affected because a receive device and a transmit device cannot reach a consistent understanding. For example, a DRX operation is performed on a sidelink, and a start definition of the DRX operation is that a start point of the radio frame number 0 is used as a reference time point. If the DRX operation is performed between the terminal device 203 and the terminal device 204, the terminal device 203 understands the reference time point of the DRX operation as a start time point of an SFN 0. However, the terminal device 204 understands the reference time point of the DRX operation as a start time point of a DFN 0. There is a time deviation of a plurality of subframe lengths between the start time point of the SFN 0 and the start time point of the DFN 0. Therefore, there is also a time deviation between activation time periods of the DRX operation determined by the two terminal devices. When the transmit device sends data in the activation time period of the DRX understood by the transmit device, the receive device may not be in the activation time period of the DRX in this case. As a result, communication quality cannot be ensured.

The following describes in detail a sidelink communication method provided in embodiments of this application with reference to the accompanying drawings.

It should be noted that, in this application, a radio frame (namely, a system frame or a direct frame) is used as an example to describe the method provided in this application. However, this application is not limited thereto. During specific implementation, the radio frame may alternatively be replaced with a subframe, a slot, or a symbol in the radio frame. To be specific, in a specific implementation described in this application as an example, a first system frame may be replaced with a first subframe in the system frame, a first direct frame and a second direct frame may be replaced with a second subframe and a third subframe in the direct frame, and a corresponding subframe may be replaced with a slot. Alternatively, in a specific implementation described as an example in this application, a first system frame may be replaced with a first slot in the system frame, a first direct frame and a second direct frame may be replaced with a second slot and a third slot in the direct frame, a corresponding subframe may be replaced with a symbol (for example, an orthogonal frequency division multiplexing (OFDM) symbol), and a corresponding number is a number of a replaced time unit. However, this application is not limited thereto.

Figure 4:
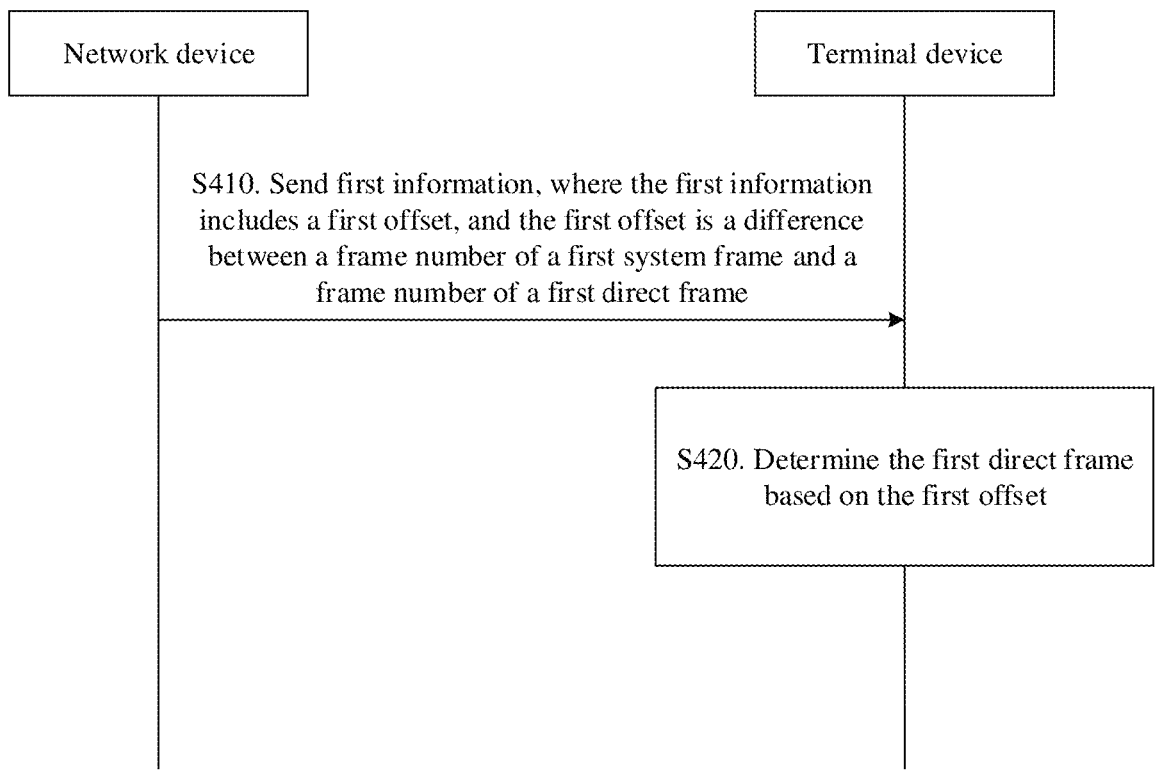
FIG. 4 is a schematic flowchart of a wireless communication method according to an embodiment of this application.

FIG. 4 is a schematic flowchart of a wireless communication method according to an embodiment of this application.

S410. A network device sends first information to a terminal device, where the first information includes a first offset, and the first offset is a difference between a frame number of a first system frame and a frame number of a first direct frame.

The terminal device receives the first information, and determines the first offset. Before S410, the terminal device has obtained a system frame in the network device, each system frame number, and a subframe number of a subframe in the system frame. The first offset is used by the terminal device to determine the frame number of the first direct frame, where the first system frame and the first direct frame partially or completely overlap in time domain.

By way of example, and not limitation, the first system frame may be any system frame in the system frame, or a system frame corresponding to a frame number preconfigured by a system or configured by a network. For example, it is specified that the first system frame is a system frame whose frame number is 0 or a system frame whose frame number is 1. This is not limited in this application.

In this application, the first direct frame may be but is not limited to one of the following direct frames:

a direct frame corresponding to a start time point (namely, a start point) of the first system frame, a direct frame corresponding to an end time point (namely, an end point) of the first system frame, or a direct frame corresponding to an intermediate time point (namely, a midpoint) of the first system frame. By way of example, and not limitation, a correspondence between the first system frame and the first direct frame may be predefined in a protocol, preconfigured by the system, configured by the network, or indicated by the network, so that the network device and the terminal device reach a consensus on the correspondence between the first system frame and the first direct frame.

Figure 5:
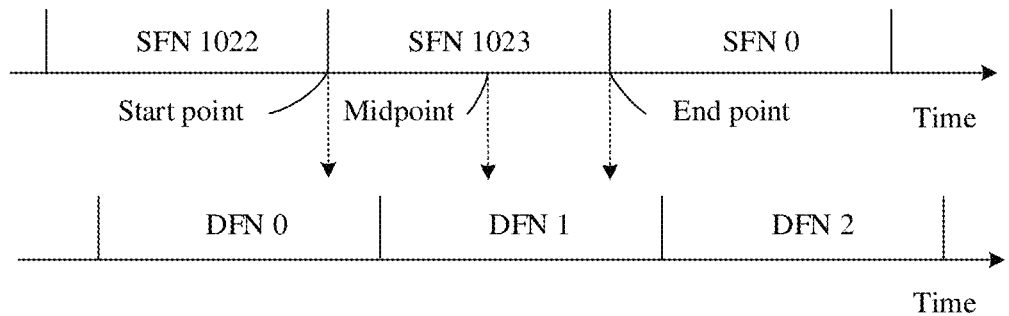
FIG. 5 is another schematic flowchart of a wireless communication method according to an embodiment of this application.

For example, as shown in FIG. 5, the first system frame is a system frame whose frame number is 1023. If the first direct frame is the direct frame corresponding to the start point of the first system frame, the first direct frame is a direct frame corresponding to a DFN 0. If the first direct frame is the direct frame corresponding to the midpoint of the first system frame or the direct frame corresponding to the end point of the first system frame, the first direct frame is a direct frame corresponding to a DFN 1.

Optionally, the network device may determine a direct frame, and a direct frame number and/or a subframe number of a subframe in the direct frame based on UTC time indicated by a GNSS device. However, this application is not limited thereto.

In an implementation, the first offset is a value obtained by subtracting the frame number of the first system frame from the frame number of the first direct frame. For example, as shown in FIG. 5, if the first system frame is a system frame corresponding to an SFN 0 and the first direct frame is a direct frame corresponding to a midpoint of the system frame corresponding to the SFN 0, the direct frame number is a DFN 2. The network device may determine that the first offset is 2.

In another implementation, the first offset is a value obtained by subtracting the frame number of the first direct frame from the frame number of the first system frame. For example, as shown in FIG. 5, if the first system frame is a system frame corresponding to an SFN 0 and the first direct frame is a direct frame corresponding to a midpoint of the SFN 0, the direct frame number is a DFN 2. The network device may determine that the first offset is −2.

By way of example, and not limitation, the first information may be carried in one or more of a system information block (SIB), a radio resource control (RRC) message, or a media access control element (MAC CE) sent by the network device.

For example, in a plurality of cases in which the first information is carried in the foregoing messages, to be specific, when a complete piece of first information can be determined by combining the plurality of cases in the foregoing messages, the first offset may include M bits in total, the highest P bit or the lowest P bit are carried in one of the foregoing messages, and remaining M-P bits are carried in another message of the foregoing messages. However, this application is not limited thereto.

S420. The terminal device determines the first direct frame based on the first offset.

Optionally, the first offset is a value obtained by subtracting the frame number of the first system frame from the frame number of the first direct frame.

For example, the frame number of the first system frame, the first offset, and the frame number of the first direct frame may satisfy:

$$D_f = (N_{max} + 1 + S_f - \Delta 1) \bmod (N_{max} + 1).$$

$D_f$ is the frame number of the first direct frame, $S_f$ is the frame number of the first system frame, $\Delta 1$ is the first offset, and $N_{max}$ is a maximum value of the frame number of the first direct frame.

Optionally, the first offset is a value obtained by subtracting the frame number of the first direct frame from the frame number of the first system frame.

For example, the frame number of the first system frame, the first offset, and the frame number of the first direct frame may satisfy:

$$D_f=(N_{max}+1+S_f+\Delta 1) \bmod (N_{max}+1).$$

Optionally, when a plurality of pieces of information obtained by the terminal device all include first offsets, in other words, when each of the plurality of pieces of information includes a complete value of the first offset, the terminal device may determine, based on a predefined priority order, to use one of the first offsets to determine the first direct frame. By way of example, and not limitation, the priority order may be an ascending order of priorities of preconfigured information, system broadcast information, and RRC unicast information.

When the network device includes a CU device and a DU device, that is, a CU-DU separation architecture is used, the system broadcast message and the RRC message are generated by the CU, and are sent to the terminal device. However, usually, the DU device can obtain a system frame number or a direct frame number accurately corresponding to a time point. Therefore, the DU may determine the first offset, and send the first offset to the CU through an interface (for example, an F1 interface) between the DU and the CU. Optionally, the CU may send a request message to the DU, where the request message requests the DU to send the first offset to the CU. Further, after obtaining the first offset, the CU may send the first information to the terminal device by using the system broadcast message or the RRC message, where the first information includes the first offset.

According to the foregoing solution, a terminal device can accurately obtain a direct frame used for sidelink communication, and a direct frame number and/or a subframe number of a subframe in the direct frame. When the terminal device performs an operation based on an accurate direct frame number, an accurate subframe number of a direct frame, or the like during sidelink communication, terminal devices can have a consistent understanding, and communication reliability can be improved.

Figure 6:
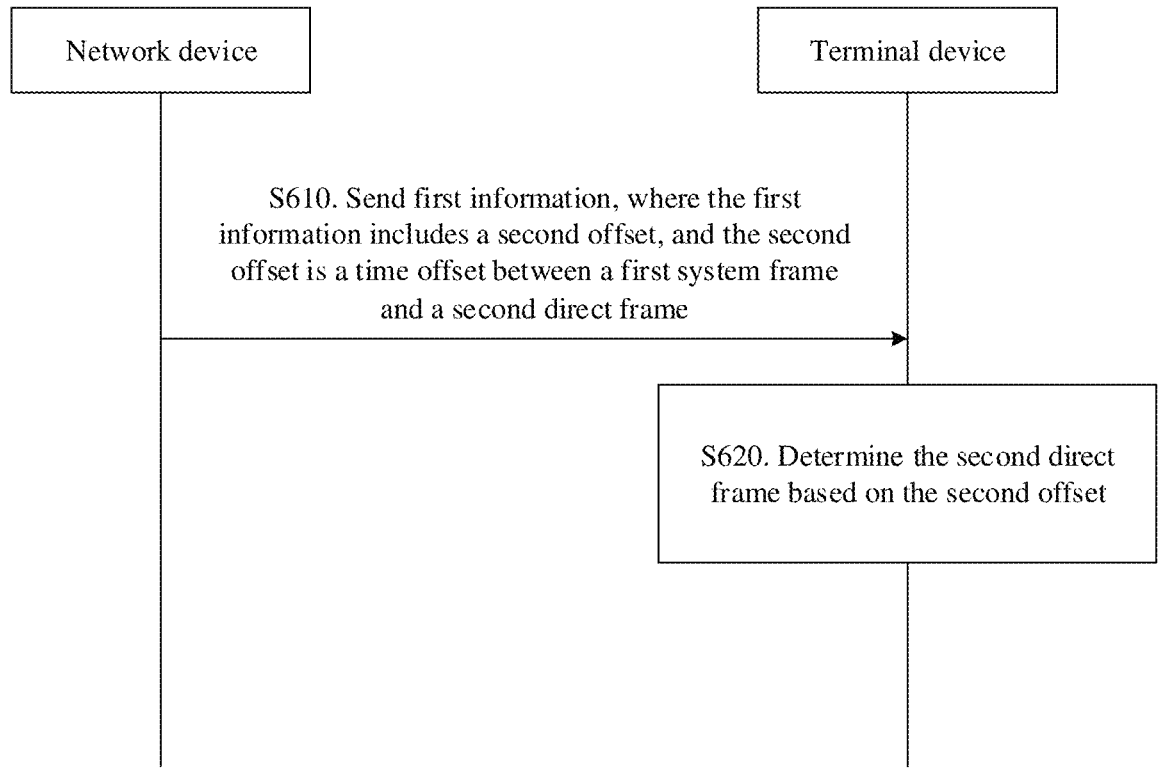
FIG. 6 is another schematic flowchart of a wireless communication method according to an embodiment of this application.

FIG. 6 is a schematic flowchart of a wireless communication method according to an embodiment of this application.

It should be noted that for content (for example, definitions of a first system frame and a first direct frame, but not limited thereto) in FIG. 6 that is the same as or similar to that in FIG. 4, refer to the descriptions in FIG. 4. For brevity, details are not described herein again.

S610. A network device sends first information to a terminal device, where the first information includes a second offset, and the second offset is a time offset between a first system frame and a second direct frame.

The terminal device receives the first information sent by the network device. Before S610, the terminal device has obtained a system frame in the network device, each system frame number, and a subframe number of a subframe in the system frame.

In this application, the second direct frame may be a direct frame whose frame number is the same as a frame number of the first system frame.

Optionally, the second offset may be a time offset between a start time point of the first system frame and a start time point of a second system frame, may be a time offset between an end time point of the first system frame and the start time point of the second system frame, or may be a time offset between a midpoint of the first system frame and a midpoint of the second system frame. However, this application is not limited thereto.

By way of example, and not limitation, a unit of the second offset may be one or more of a frame, a subframe, a symbol, a second s, a millisecond ms, hundreds of microseconds (100 μs), ten microseconds (10 μs), or a microsecond μs.

In an implementation, the second direct frame is specifically the first direct frame that is earlier or later than the first system frame in terms of time and whose frame number is the same as the frame number of the first system frame.

Figure 7:
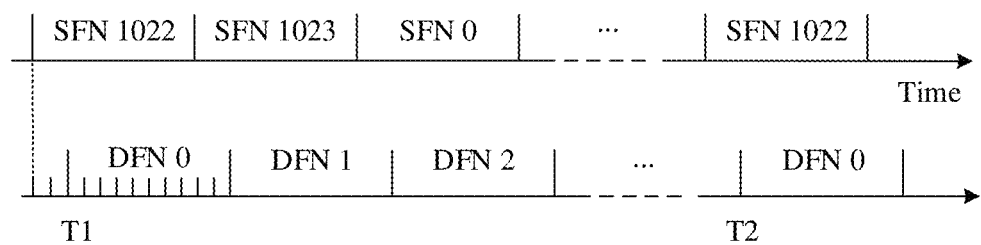
FIG. 7 is a schematic diagram of determining a direct frame according to an embodiment of this application.

For example, the second direct frame is the first direct frame that is earlier than the first system frame in terms of time and whose frame number is the same as the frame number of the first system frame. As shown in FIG. 7, for example, the first system frame is a system frame whose SFN is 0, and the first direct frame whose DFN is 0 and that is earlier than the first system frame in terms of time is a direct frame whose start point is a moment T1. In this case, the second direct frame is a direct frame that corresponds to the DFN 0 and whose start point is the moment T1. For example, if the unit of the second offset may be the frame, the network device may determine that the second offset is −2 frames. Alternatively, if the unit of the second offset may be the subframe, the network device may determine that the second offset is −18 subframes.

For another example, the second direct frame is the first direct frame that is later than the first system frame in terms of time and whose frame number is the same as the frame number of the first system frame. As shown in FIG. 7, for example, the first system frame is a system frame corresponding to an SFN 0 and the first direct frame whose DFN is 0 and that is later than the SFN 0 in terms of time is a direct frame whose start point is a moment T2. In this case, the second direct frame is a direct frame that corresponds to the DFN 0 and whose start point is the moment T2. For example, if the unit of the second offset may be the frame, the network device may determine that the second offset is 1022 frames. Alternatively, if the unit of the second offset may be the subframe, the network device may determine that the second offset is 10222 subframes.

In another implementation, the second direct frame is specifically a direct frame that has a smallest time difference from the first system frame and that is in one or more direct frames whose frame number is the same as the frame number of the first system frame.

For example, as shown in FIG. 7, the first system frame is a system frame corresponding to an SFN 0, and the direct frame whose frame number is the same as the frame number of the first system frame and has the smallest time difference is a direct frame that corresponds to a DFN 0 and whose start point is T1. In this case, the second direct frame is the direct frame that corresponds to the DFN 0 and whose start point is the moment T1. The network device may determine the second offset based on the second direct frame.

It should be noted that, when duration of a system frame is equal to duration of a direct frame (for example, 10 ms), any system frame may be used as the first system frame, and a difference between a frame number of the any system frame and a frame number of the first direct frame corresponding to the any system frame is the first offset. For example, when the system frame corresponding to the SFN 0 shown in FIG. 7 is used as the first system frame, the frame number of the first direct frame corresponding to the first system frame is a DFN 2, and the first offset is −2, a frame number difference between the any system frame such as a system frame corresponding to an SFN 1022, and the first direct frame corresponding to the any system frame, namely, a direct frame whose frame number is the DFN 0, is the first offset, namely, −2. Alternatively, a time deviation between the any system frame and the second direct frame corresponding to the any system frame is the second offset. For example, when the system frame corresponding to the SFN 0 shown in FIG. 7 is used as the first system frame, the second direct frame corresponding to the system frame is a direct frame that corresponds to the DFN 0 and whose start time point is T2, and the second offset is 1022 frames, a time deviation between the any system frame such as a system frame whose frame number is an SFN 1023, and the first direct frame corresponding to the any system frame, namely, the first direct frame whose frame number is a DFN 1 after the moment T1, is the second offset, namely, 1022 frames. This application is described by using a case in which the duration of the system frame is equal to the duration of the direct frame. However, this application is also applicable to a case in which the duration of the system frame is not equal to the duration of the direct frame. The network device and the terminal device may further determine the direct frame, the direct frame number and the subframe number of the direct frame with reference to the duration of the system frame and/or the duration of the direct frame.

S620. The terminal device determines the second direct frame based on the second offset.

After receiving the first information, the terminal device may determine a time location of the second direct frame and the frame number (that is, the frame number is the same as the frame number of the first system frame) of the second direct frame based on the second offset.

By way of example, and not a limitation, the unit of the second offset is the subframe or the millisecond. The terminal device determines the frame number of the first direct frame corresponding to a first subframe in the first system frame according to the following formula, where a time domain range of the first subframe is within a time domain range of the second direct frame:

$$D_f = \lfloor N_{max} + 1 + S_f + (S_{sub} - \Delta 2)/N_{sub} \rfloor \bmod (N_{max} + 1),$$
where mod represents obtaining a modulo value, $\lfloor \cdot \rfloor$ represents rounding down, $D_f$ is the frame number of the second direct frame, $S_f$ is the frame number of the first system frame, $S_{sub}$ is a subframe number of the first subframe in the first system frame, $N_{sub}$ is a total quantity of subframes included in each direct frame, $N_{max}$ is a maximum value of the frame number of the first direct frame, $\Delta 2$ is the second offset, and the unit of the second offset is the subframe or the millisecond.

Figure 8:
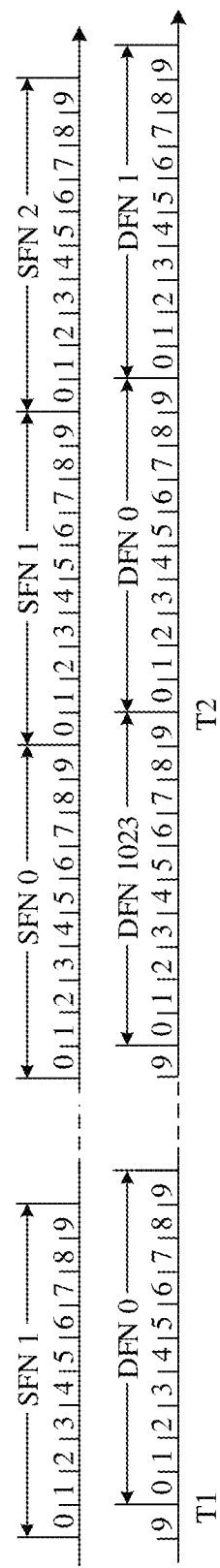
FIG. 8 is another schematic diagram of determining a direct frame according to an embodiment of this application.

For example, the second direct frame is the first direct frame that is later than the first system frame in terms of time and whose frame number is the same as the frame number of the first system frame, or the second direct frame is specifically a direct frame that has a smallest time difference from the first system frame and that is in one or more direct frames whose frame number is the same as the frame number of the first system frame. As shown in FIG. 8, a maximum value of the frame number of the direct frame is 1023, that is, $N_{max}=1023$, and each direct frame includes 10 subframes, that is, $N_{sub}=10$. The first system frame is a system frame corresponding to an SFN 0. In this case, the second direct frame is a direct frame that corresponds to a DFN 0 and whose start time point is T2, and the second offset Δ2 is 11 subframes. Therefore, in the system frame whose frame number is the SFN 0, a frame number of a direct frame corresponding to a subframe whose subframe number is 9 is 1023, that is, $$D_f = \lfloor 1023 + 1 + 0 + (9-11)/10 \rfloor \bmod (1023+1), \text{ and}$$

in the system frame whose frame number is the SFN 0, a frame number of a direct frame corresponding to a subframe whose subframe number is 0 is 1022, that is, $$D_f = \lfloor 1023 + 1 + 0 + (0-11)/10 \rfloor \bmod (1023+1) = 1022.$$

For another example, the second direct frame is the first direct frame that is earlier than the first system frame in terms of time and whose frame number is the same as the frame number of the first system frame. As shown in FIG. 8, the first system frame is a system frame corresponding to an SFN 0, the second direct frame is a direct frame that corresponds to a DFN 0 and whose start time point is T1, the second offset Δ2 is −10229 subframes, and Nsub is 10. Therefore, in the system frame whose frame number is the SFN 0, a frame number of a direct frame corresponding to a subframe whose subframe number is 9 is 1023, that is, $$D_f = \lfloor 1023 + 1 + 0 + (9+10229)/10 \rfloor \bmod (1023+1) = 1023,$$
and in the system frame whose frame number is the SFN 0, a frame number of a direct frame corresponding to a subframe whose subframe number is 0 is 1022, that is, $$D_f = \lfloor 1023 + 1 + 0 + (0+10229)/10 \rfloor \bmod (1023+1) = 1022.$$

Optionally, after determining the direct frame number, the terminal device may determine the subframe number of the subframe in the direct frame based on a subframe length and/or a quantity of subframes in the direct frame.

Optionally, the terminal device may determine a subframe number of a second subframe in the first direct frame corresponding to the first subframe based on the second offset and the subframe number of the first subframe in the first system frame. The first subframe and the second subframe partially or completely overlap. For example, the second subframe may be a subframe in a second direct frame corresponding to a start point, a midpoint, or an end point of the first subframe.

By way of example, and not limitation, the second offset, the subframe number of the first subframe, and the subframe number of the second subframe satisfy:

$$D_{sub} = (S_{sub} - \Delta 2 \bmod N_{sub} + N_{sub}) \bmod N_{sub}, \text{ where}$$

$D_{sub}$ is the subframe number of the second subframe.

For example, as shown in FIG. 8, the second offset Δ2 is 11 subframes, and $N_{sub}$ is 10. In this case, a subframe number of the direct frame corresponding to a subframe whose subframe number is 7 in a system frame is 6, that is, $$D_{sub} = (7-11 \bmod 10 + 10) \bmod 10 = 6.$$

Optionally, according to the foregoing method, after determining the direct frame number based on the first offset or the second offset, the terminal device may determine each direct frame number based on a sequential arrangement order and/or duration of direct frames. Alternatively, according to the foregoing method, the terminal device may determine a frame number of a corresponding first direct frame based on the first offset and each system frame number.

Optionally, when a plurality of pieces of information obtained by the terminal device all include second offsets, in other words, when each of the plurality of pieces of information includes a complete value of the second offset, the terminal device may determine, based on a predefined priority order, to use one of the second offsets to determine the first direct frame. By way of example, and not limitation, the priority order may be an ascending order of priorities of preconfigured information, system broadcast information, and RRC unicast information.

When the network device includes a CU device and a DU device, that is, a CU-DU separation architecture is used, the system broadcast message and the RRC message are generated by the CU, and are sent to the terminal device. However, usually, the DU device can obtain a system frame number or a direct frame number accurately corresponding to a time point. Therefore, the DU may determine the second offset, and send the second offset to the CU through an interface (for example, an F1 interface) between the DU and the CU. Optionally, the CU may send a request message to the DU, to request the DU to send the second offset to the CU. Further, after obtaining the second offset, the CU may send the first information to the terminal device by using the system broadcast message or the RRC message, where the first information includes the second offset.

According to the foregoing solution, a terminal device can accurately obtain a direct frame used for sidelink communication, and a direct frame number and/or a subframe number of a subframe in the direct frame. When the terminal device performs an operation based on an accurate direct frame number, an accurate subframe number of a direct frame, or the like during sidelink communication, terminal devices can have a consistent understanding, and communication reliability can be improved.

Figure 9:
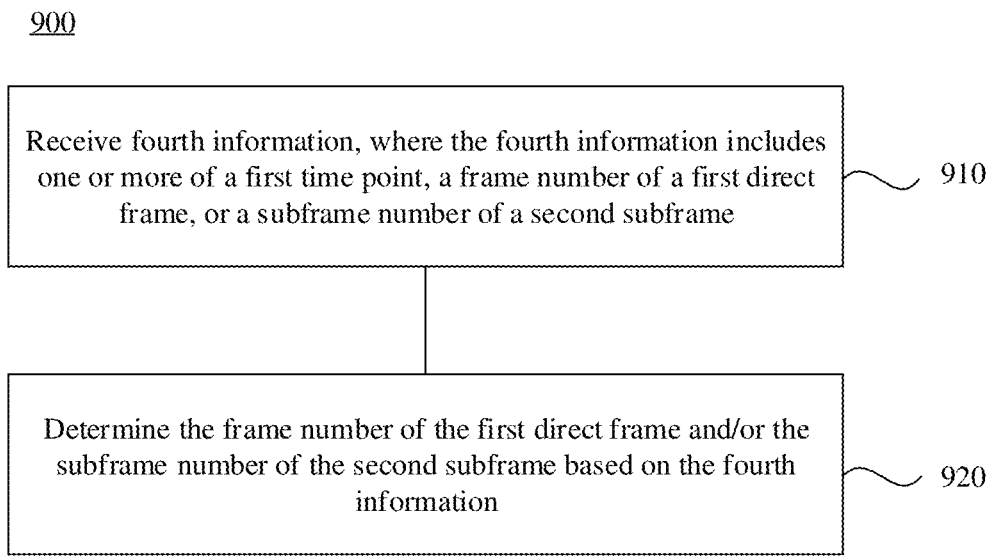
FIG. 9 is another schematic flowchart of a wireless communication method according to an embodiment of this application.

FIG. 9 is another schematic flowchart of a wireless communication method according to an embodiment of this application.

It should be noted that, unless otherwise specified, for a part that is in the embodiment in FIG. 9 and that is the same as or similar to the foregoing descriptions, refer to the foregoing descriptions. For brevity, details are not described herein again.

S910. A first terminal device receives fourth information, where the fourth information indicates one or more of a first time point, a frame number of a first direct frame, or a subframe number of a second subframe.

The first direct frame is a frame in a direct frame, the second subframe is a subframe in the first direct frame, and the first time point is used by the first terminal device to determine the first direct frame and/or the second subframe.

In an implementation, the fourth information is sent by a network device.

In another implementation, the fourth information is sent by a second terminal device to the first terminal device.

S920. The first terminal device determines the frame number of the first direct frame and/or the subframe number of the second subframe based on the fourth information.

In an implementation, the fourth information is sent by the network device to the first terminal device.

By way of example, and not limitation, the fourth information is carried in a system information block or an RRC message sent by the network device.

Optionally, the fourth information specifically indicates a time point (or a moment) of a first reference point, that is, a first time point is the time point of the first reference point.

By way of example, and not limitation, the first reference point may be but is not limited to one of the following reference points:

a start point, a midpoint, or an end point of the last system frame in which the fourth information is sent or the last subframe in which the fourth information is sent in the system frame, where the last system frame is a first system frame, and the last subframe is a first subframe in the first system frame;

a time point corresponding to the first system frame in which the fourth information is sent or the first subframe that is in the first system frame and that is plus or minus an offset; and a time point that is in the first system frame or the first subframe and that is specified in a protocol, preset by a system, or indicated by the network device.

Optionally, the fourth information further includes a frame number of the first system frame and/or a subframe number of the first subframe, and the first reference point is a time point in the first system frame and/or the first subframe. The fourth information may be sent in a system frame other than the first system frame, or may be sent in the first system frame. Alternatively, the fourth information may be sent in a subframe other than the first subframe, or may be sent in the first subframe. This is not limited in this application. After receiving the fourth information, the first terminal device determines the first reference point and the first time point in the first system frame and/or the first subframe, and determines the frame number of the first direct frame and/or the subframe number of the second subframe corresponding to the first reference point based on the first reference point and the first time point.

For example, the fourth information is carried in the RRC message sent by the network device, and the first reference point is preset by a system or configured by a network as an end point of the last subframe that carries the RRC message. After receiving the fourth information, the first terminal device obtains the first time point, and determines that the last subframe that carries the RRC message is the first subframe in the first system frame. In this case, a time point corresponding to the end point of the first subframe is the first time point. The first terminal device determines, based on the first time point and the end point of the first subframe, a frame number of the direct frame (namely, the first direct frame) or a subframe number of the subframe (namely, the second subframe) in the direct frame, where the direct frame is corresponding to the end point of the first subframe.

For another example, the fourth information may be carried in the system information block SIB sent by the network device, and the first reference point may be an end point of a time window in which the first terminal device receives the system information block, or a closest system frame boundary location after an end moment of the time window. The first time point is the end point of the time window, or a time point corresponding to the closest system frame boundary location after the end moment of the time window.

Optionally, the first time point is UTC time or global positioning system (GPS) time. The first time point is used by the first terminal device to determine the first direct frame or the second subframe.

For example, the fourth information is carried in the SIB sent by the network device, the first reference point is an end point of the last subframe (where the last subframe is a subframe in the system frame, for example, a subframe A) that carries the SIB, and the fourth information specifically indicates UTC time corresponding to the end point of the subframe A. After receiving the fourth information and determining the UTC time, the first terminal device determines, based on the UTC time and the end point of the subframe A, a frame number of the direct frame (namely, the first direct frame) or a subframe number of the subframe (namely, the second subframe) in the direct frame, where the direct frame is corresponding to the end point of the first subframe.

By way of example, and not limitation, a unit of the first time point is a millisecond, hundreds of microseconds (100 µs), ten microseconds (10 µs), or a microsecond, in other words, precision of the first time point is a millisecond, hundreds of microseconds, ten microseconds, or a microsecond.

Optionally, the network device sends a third offset to the first terminal device, where the third offset is a time offset between the UTC time and the GPS time, and the third offset may be written as leapSeconds. However, this application is not limited thereto. The third offset may be carried in the fourth information, or may be carried in other information. This is not limited in this application. The network device sends the third offset to the first terminal device, so that the first terminal device can determine the UTC time based on the third offset and the GPS time, and further determine time locations of the direct frame and/or the subframe in the direct frame, the corresponding frame number, and the corresponding subframe number based on the UTC time.

For example, the fourth information may be carried in the system information block SIB sent by the network device, and the first reference point may be a start point (for example, a reference point A) of a system frame in which the first synchronization signal block after the system frame in which the SIB is sent is located. After receiving the fourth information, the first terminal device obtains the GPS time indicated by the fourth information. The first terminal device determines UTC time corresponding to the reference point A based on the third offset and the GPS time, and then determines a frame number of a first direct frame or a subframe number of a second subframe corresponding to the reference point A based on the UTC time and the reference point A. In another implementation, the fourth information is carried in one or more of an RRC message, a packet data convergence protocol (PDCP) layer control protocol data unit (PDU), a radio link control (RLC) layer control PDU, a MAC CE, or SCI that are sent by a second terminal device.

The second terminal device may determine the direct frame and the corresponding frame number and/or subframe number by using the method in FIG. 4 and FIG. 6 or by using fourth information sent by another device. Alternatively, the second terminal device determines the direct frame and the corresponding frame number and/or subframe number by using UTC time sent by a GNSS device.

According to the foregoing solution, a terminal device can accurately obtain a direct frame used for sidelink communication, and a direct frame number and/or a subframe number of a subframe in the direct frame. When the terminal device performs an operation based on an accurate direct frame number, an accurate subframe number of a direct frame, or the like during sidelink communication, terminal devices can have a consistent understanding, and communication reliability can be improved.

Optionally, the fourth information is carried in the RRC message sent by the second terminal device.

When the fourth information includes the first time point, for the first time point, refer to the foregoing descriptions. For brevity, details are not described herein again. When the subframe number of the second subframe is included in the RRC message, the second subframe is the subframe in the first direct frame in which the RRC message is initially transmitted.

Optionally, the fourth information is carried in the MAC CE message sent by the second terminal device.

When the fourth information includes the first time point, for the first time point, refer to the foregoing descriptions. For brevity, details are not described herein again. When the MAC CE includes the frame number of the first direct frame, the first direct frame is a direct frame in which the MAC CE is initially transmitted, and when the MAC CE includes the subframe number of the second subframe, the second subframe is a subframe in a first direct frame in which the MAC CE is initially transmitted.

According to the foregoing solution, due to impact of a channel condition, the first terminal device fails to receive the RRC message or the MAC CE when the RRC message or the MAC CE is initially transmitted, but successfully receives the RRC message or the MAC CE when the RRC message or the MAC CE is retransmitted (or referred to as retransmission). It is specified that, regardless of initial transmission or retransmission, the fourth information in the RRC message or the MAC CE indicates related information (for example, the first time point, the frame number, or the subframe number) about the first direct frame or the second subframe used during initial transmission. In this way, a transmit end does not need to reassemble a packet for sending, to reduce implementation complexity.

Optionally, the fourth information is carried in the SCI sent by the second terminal device.

When the fourth information includes the first time point, for the first time point, refer to the foregoing descriptions. For brevity, details are not described herein again. When the SCI includes the frame number of the first direct frame, the first direct frame is a direct frame carrying the SCI, or when the SCI includes the subframe number of the second subframe, the second subframe is a subframe in a first direct frame carrying the SCI.

By way of example, and not limitation, the SCI may be SCI for scheduling a medium access control (MAC) protocol data unit (PDU), or may be SCI not for scheduling a medium access control (MAC) protocol data unit (PDU), for example, a physical sidelink control channel (PSCCH) order (which may be written as a PSCCH order).

Optionally, the fourth information is carried in a plurality of the RRC message, the PCDP layer control PDU, the RLC layer control PDU, the MAC CE, or the SCI sent by the second terminal device.

In other words, the fourth information may be indicated by using two or more levels of information. For example, the first time point, the first direct frame, or the second subframe includes N bits in total. A high K bit is indicated by using one type of information in the RRC message, the PCDP layer control PDU, the RLC layer control PDU, the MAC CE, or the SCI, and another N-K bit is indicated by using another type of information. However, this application is not limited thereto.

By way of example, and not a limitation, when the fourth information is indicated by a plurality of levels of information, it may be specified that the fourth information indicates related information (for example, the first time point, the frame number, or the subframe number) about a first direct frame or a second subframe in which one level of information in the plurality of levels of information is located.

According to the foregoing solution, the fourth information is carried in the plurality of levels of information, so that signaling overheads of a single piece of information can be reduced, and resource utilization can be improved.

In another implementation, the fourth information is carried in a sidelink synchronization signal block (S-SSB) sent by the second terminal device.

The second terminal device may determine the direct frame and the corresponding frame number and/or subframe number by using the method in FIG. 4 and FIG. 6 or by using fourth information sent by another device. Alternatively, the second terminal device determines the direct frame and the frame number and/or subframe number by using the UTC time sent by the GNSS device.

The S-SSB includes one or more of the frame number of the first direct frame, the subframe number of the second subframe, or a number of a first slot. The first direct frame is a direct frame in which the S-SSB is sent, the second subframe is a subframe in which the S-SSB is located and that is in the first direct frame, and the first slot is a slot in which the S-SSB is located and that is in the first direct frame.

Optionally, a master information block-sidelink (MIB-SL) in the S-SSB includes an indicator field, and the indicator field indicates one or more of the following cases:

whether a radio frame number indicated by the S-SSB is the frame number of the first direct frame;

whether a subframe number indicated by the S-SSB is the subframe number of the second subframe; and whether the number of the slot indicated by the S-SSB is a number of the slot in the first direct frame.

When a result indicated by the indicator field is yes, the first terminal device determines the direct frame and the direct frame number, the subframe number, or the number of the slot based on the fourth information included in the S-SSB. By way of example, and not a limitation, the indicator field may indicate "true (true)" or "false (false)" to indicate that a related parameter (for example, the frame number, the subframe number, or the number of the slot) of the radio frame indicated by the S-SSB is a related parameter of the first direct frame. Alternatively, the indicator field may indicate "0" or "1" to indicate that a related parameter (for example, the frame number, the subframe number, or the number of the slot) of the radio frame indicated by the S-SSB is a related parameter of the first direct frame. However, this application is not limited thereto.

For example, when the second terminal device uses the GNSS as a synchronization source, or the second terminal device uses the network device as the synchronization source and determines the direct frame by using a first offset or a second offset, when the second terminal device is used as a synchronization source of another terminal device, the indicator field in the MIB-SL indicates that the related parameter (for example, the frame number, the subframe number, or the number of the slot) of the radio frame indicated by the S-SSB is the related parameter of the direct frame. After receiving the indicator field, the first terminal device determines the direct frame and the direct frame number, the subframe number, or the number of the slot. If the indicator field indicates that the related parameter (for example, the frame number, the subframe number, or the number of the slot) of the radio frame indicated by the S-SSB is not the related parameter of the first direct frame, the first terminal device does not determine the direct frame, the direct frame number, the subframe number, or the number of the slot based on the related information indicated by the S-SSB.

Optionally, before the first terminal device receives the fourth information sent by the second terminal device, the first terminal device exchanges information with the second terminal device. If the second terminal device determines that direct frames in the first terminal device and the second terminal device are not aligned or the first terminal device does not obtain information about the direct frame, the second terminal device sends the fourth information to the first terminal device, so that the direct frames determined by the first terminal device and the second terminal device are aligned, in other words, the first terminal device and the second terminal device have a consistent understanding of the time location of the direct frame, the direct frame number, and/or the subframe number of the direct frame.

For example, the second terminal device sends information about an obtained direct frame to the first terminal device, and the first terminal device sends information about an obtained direct frame to the second terminal device or notifies the second terminal device that the first terminal device does not obtain the information about the direct frame. When the second terminal device determines that the direct frame obtained by the second terminal device is not aligned with the direct frame obtained by the first terminal device, or determines that the first terminal device does not obtain the information about the direct frame, the second terminal device initiates a frame alignment process, to be specific, sends the fourth information, so that the first terminal device determines the direct frame based on the fourth information, and aligns the direct frame with the direct frame in the second terminal device.

In this application, after receiving the fourth information, if the fourth information includes the first time point, the first terminal device determines the time location of the direct frame, and the corresponding frame number and subframe number. When the fourth information includes the frame number of the first direct frame, the first terminal device determines the frame number of the first direct frame. Optionally, the first terminal device determines the subframe number of the subframe in the first direct frame based on the frame number of the first direct frame, a quantity of subframes included in the first direct frame, and a numbering sequence of subframe numbers. If the fourth information includes the subframe number of the second subframe, the first terminal device determines the subframe number of the second subframe.

According to the foregoing solution, a terminal device can obtain a direct frame used for sidelink communication, and a direct frame number and/or a subframe number of a subframe in the direct frame. When the terminal device performs an operation based on an accurate direct frame number, an accurate subframe number of a direct frame, or the like during sidelink communication, terminal devices can have a consistent understanding, and communication reliability can be improved.

Optionally, when the first terminal device successfully receives the fourth information, or after the first terminal device determines the frame number of the first direct frame and/or the subframe number of the second subframe, the first terminal device may send fifth information. The fifth information indicates that the first terminal device successfully receives the fourth information.

Optionally, when the fourth information is received from the network device, the first terminal device sends the fifth information to the network device, or when the fourth information is received from the second terminal device, the first terminal device sends the fifth information to the second terminal device.

According to the foregoing solution, when the first terminal device successfully receives the fourth information, the first terminal device notifies a device that sends the fourth information, to avoid a case in which the device that sends the fourth information cannot determine whether the first terminal device successfully receives the fourth information.

Optionally, when the first terminal device fails to receive the fourth information, the first terminal device may send the fifth information, where the fifth information indicates that the first terminal device fails to receive the fourth information.

According to the foregoing solution, when the first terminal device fails to receive the fourth information, the first terminal device notifies the device that sends the fourth information, so that the device that sends the fourth information sends the fourth information again, and the first terminal device obtains the information about the direct frame.

Figure 10:
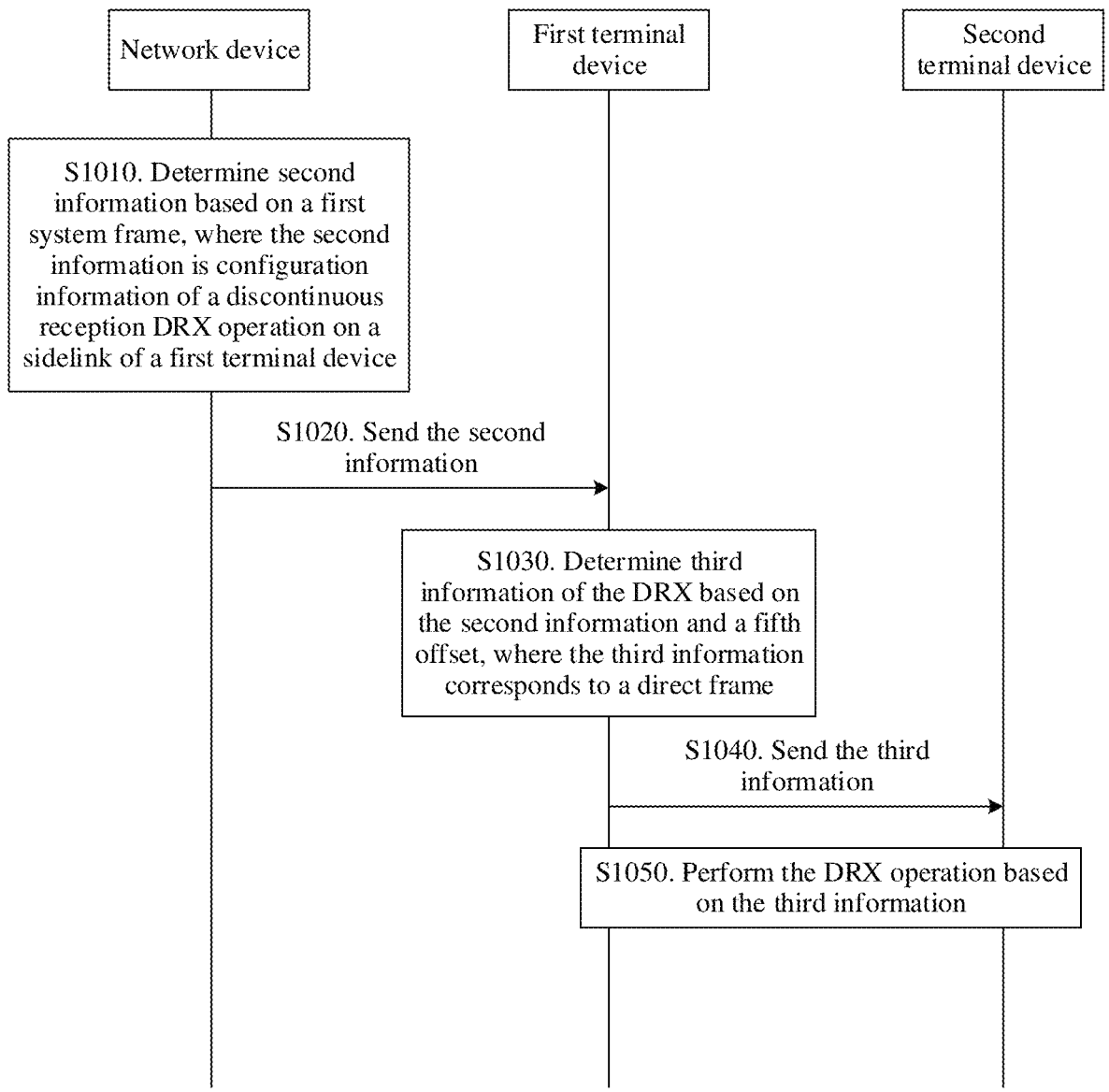
FIG. 10 is another schematic flowchart of a wireless communication method according to an embodiment of this application.

FIG. 10 is another schematic flowchart of a sidelink communication method according to an embodiment of this application.

S1010. A network device determines second information based on a system frame, where the second information is configuration information of a discontinuous reception (DRX) operation on a sidelink of a first terminal device.

The DRX operation is used to control the first terminal device to receive a signal of a sidelink. The network device determines the second information based on the system frame. For example, the network device determines a fourth offset of a start moment of the DRX operation by using a start time point of a first system frame as a reference frame. By way of example, and not a limitation, the first system frame may be a system frame having a specified frame number, for example, a system frame 0 or a system frame 10. However, this application is not limited thereto.

S1020. The network device sends the second information to the first terminal device.

The first terminal device receives the second information sent by the network device, to determine the configuration information of the DRX that is determined by the network device based on a system frame number.

S1030. The first terminal device determines third information of the discontinuous reception based on the second information and a fifth offset, where the third information corresponds to a direct frame number.

After receiving the second information, the first terminal device determines the third information of the discontinuous reception based on the second information and the fifth offset. The fifth offset is an offset between the system frame and a direct frame. Optionally, the fifth offset may be the first offset or the second offset. Alternatively, the offset may be an offset that is between the system frame and the direct frame and that is determined by the first terminal device after the first terminal device obtains information about the direct frame and information about the system frame. However, this application is not limited thereto. For example, the network device determines the fourth offset of the start moment of the DRX based on the system frame 0, and after receiving the second information, the first terminal device determines a sixth offset between a direct frame 0 and the start moment of the DRX based on the fifth offset and the fourth offset. The third information includes the sixth offset between the direct frame 0 and the start moment of the DRX, and the third information includes the sixth offset. However, this application is not limited thereto.

Optionally, the second information and the first information may be carried in a same message sent by the network device, for example, a system message or an RRC message.

For example, after the network device receives requested configuration information that is of the DRX on the sidelink and that is sent by the first terminal device, the network device sends an RRC reconfiguration message including the first information and the second information to the first terminal device.

S1040. The first terminal device sends the third information to a second terminal device.

The second terminal device receives the third information sent by the first terminal device, and determines the configuration information of the DRX operation corresponding to the direct frame, where the second terminal device and the first terminal device reach a consistent understanding of the direct frame. For example, direct frame alignment is completed by using the foregoing frame alignment process.

S1050. The first terminal device and the second terminal device perform the DRX operation based on the second information.

The first terminal device determines a direct frame, and a subframe or a slot in the direct frame that is of the DRX operation and that is in an activation time period based on the second information, and receives the signal of the sidelink in the activation time period of the DRX. The second terminal device determines the direct frame, the subframe or the slot in the direct frame that is of the DRX operation and that is in the activation time period based on the second information, and sends the signal to the first terminal device in the activation time period of the DRX.

According to the foregoing solution, after receiving the second information that is of the DRX and that is determined by the network device based on the system frame, the first terminal device determines, based on the second information and the offset between the system frame and the direct frame, the third information that is of the DRX and that corresponds to the direct frame, and notifies the second terminal device. This can avoid a case in which the second terminal device incorrectly understands the DRX when the second terminal device cannot obtain the information about the system frame in the network device (for example, the second terminal device is not within coverage of the network device), so that the first terminal device and the second terminal device have a consistent understanding of the DRX, to ensure communication reliability.

Optionally, it may be configured by the network device or predefined in a protocol that when the two terminal devices satisfy one or more of the following conditions, the two terminal devices may exchange the configuration information of the DRX, to perform the DRX operation on the sidelink:

Condition 1: At least one or two of the two terminal devices are located within coverage of a GNSS device or the network device.

Condition 2: At least one or two of the two terminal devices use a GNSS device or the network device as a synchronization source.

Condition 3: At least one or two of the two terminal devices can obtain the information about the direct frame, for example, the direct frame number or a subframe number of the direct frame.

Condition 4: At least one or two of the two terminal devices can obtain UTC time.

When the foregoing condition is not satisfied, the two terminal devices cannot perform the DRX operation on the sidelink, or do not perform the DRX operation.

In an optional implementation of this application, the two terminal devices may exchange auxiliary information, and determine, based on the auxiliary information, whether to exchange the configuration information of the DRX operation on the sidelink.

Optionally, the auxiliary information may include one or more of the following information:

information about the synchronization source, information about whether the direct frame can be obtained, or information about whether the DRX operation is allowed.

The information about the synchronization source indicates a synchronization source of the terminal device that sends the auxiliary information. For example, the synchronization source may be the GNSS device, the network device (for example, a gNB or an eNB), or another terminal device (for example, a terminal device directly or indirectly synchronized with the GNSS device, a terminal device directly or indirectly synchronized with the network device, or a terminal device synchronized with another terminal device). Optionally, when the synchronization source is one terminal device, the auxiliary information may further include a sidelink synchronization signal block identifier (SLSSID) of the synchronization source terminal device.

When the information about the direct frame can be determined, the terminal device that sends the auxiliary information may indicate, in the auxiliary information, that the information about the direct frame can be obtained. For example, whether the information about the direct frame can be obtained may be written as dfnAvailable. When the information about the direct frame can be obtained, dfnAvailable=true, and when the information about the direct frame cannot be determined, it is indicated in the auxiliary information that the information about the direct frame cannot be obtained, for example, dfnAvailable=false.

The terminal device that sends the auxiliary information may be preset by a system, configured by the network device, or predefined in the protocol to restrict the terminal device to not performing the DRX operation on the sidelink. In this case, in the auxiliary information sent by the terminal device, the information (for example, may be written as drxAllowed) about whether to allow the DRX operation indicates that the DRX operation is not allowed, for example, may be written as drxAllowed=false. If the DRX operation is allowed, the information about whether the DRX operation is allowed indicates that DRX operation is allowed, for example, drxAllowed=true.

By way of example, and not a limitation, the auxiliary information is carried in a PC5-S message and/or an RRC message sent by the terminal device.

Optionally, all the auxiliary information may be carried in one message. Alternatively, a part of the auxiliary information may be carried in the PC5-S message, and other information may be carried in the RRC information. Alternatively, the auxiliary information may be carried in different PC5-S messages or different RRC messages.

Optionally, one terminal device may send a request message for requesting the auxiliary information to another terminal device, and after the another terminal device receives the request message, the another terminal device sends the auxiliary information to the terminal device.

When the two terminal devices determine to exchange the configuration information of the DRX operation on the sidelink, the two terminal devices exchange the configuration information of the DRX operation on the sidelink, and perform the DRX operation based on the configuration information.

According to the foregoing solution, the two terminal devices determine, by exchanging the auxiliary information of the DRX operation, such as a synchronization source type and information about whether the DFN can be obtained, whether to exchange the configuration information of the DRX operation on the sidelink. This can avoid a case in which communication quality cannot be ensured because the two terminal devices have inconsistent understandings of the DRX on the sideline.

In a possible implementation of this application, when the terminal device obtains both the information about the direct frame and the information about the system frame in the network device, the offset (for example, the first offset or the second offset, but not limited thereto) that is between the direct frame and the system frame and that is determined by the first terminal device may be reported to the network device. Optionally, the network device may send, to the terminal device, request information for requesting to report the offset between the direct frame and the system frame. After receiving the request information, the terminal device reports the offset between the direct frame and the system frame to a network.

For example, the terminal device synchronously obtains the information about the direct frame with the GNSS device or another terminal device, and the terminal device is within the coverage of the network device, and synchronously determines the system frame in the network device with the network device. The terminal device determines the offset between the direct frame and the system frame based on the information about the direct frame and the information about the system frame.

Optionally, when the terminal device requests the network device to configure the DRX operation on the sidelink, the terminal device sends the offset between the direct frame and the system frame to the network device. The network device learns of, based on the offset that is between the direct frame and the system frame and that is reported by the terminal device, the information about the direct frame that can be determined by the terminal device, for example, information such as the direct frame number and a time domain location of the direct frame, to further determine the configuration information of the DRX on the sidelink corresponding to the direct frame number, that is, the third information is determined by the network device and sent to the terminal device. After receiving the third information, the terminal device sends the third information of the DRX to the another terminal device, and the two terminal devices perform the DRX operation based on the third information.

According to the foregoing solution, the terminal device determines the offset between the system frame and the direct frame in the network device, and the network device determines, based on the offset reported by the terminal device, the configuration information of the DRX operation that is on the sidelink and that corresponds to the direct frame. This can avoid a case in which the two terminal devices that perform the DRX operation have inconsistent understandings of the DRX operation, and communication reliability can be improved.

It should be noted that, during specific implementation, a part of steps in FIG. 4, FIG. 6, FIG. 9, and FIG. 10 may be selected for implementation, a sequence of the steps in the figures may be adjusted for implementation, or embodiments are mutually combined. This is not limited in this application. It should be understood that performing a part of steps in the figures, adjusting the sequence of the steps, or performing mutual combination for specific implementation falls within the protection scope of this application.

The foregoing describes in detail the methods provided in embodiments of this application with reference to FIG. 4 to FIG. 10. The following describes in detail apparatuses provided in embodiments of this application with reference to FIG. 11 to FIG. 13.

Figure 11:
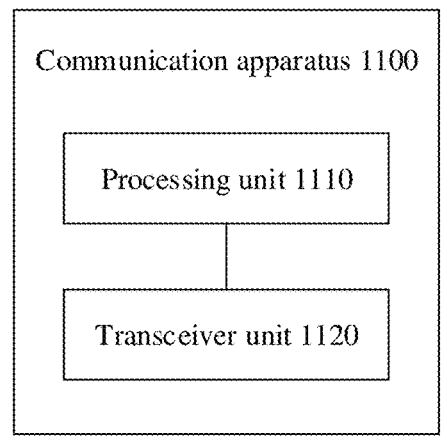
FIG. 11 is a schematic block diagram of a communication apparatus according to this application.

FIG. 11 is a schematic block diagram of a communication apparatus according to an embodiment of this application. As shown in FIG. 11, the communication apparatus 1100 may include a processing unit 1110 and a transceiver unit 1120.

In a possible design, the communication apparatus 1100 may correspond to the terminal device in the foregoing method embodiments, or may be a chip disposed (or configured) in the terminal device.

For example, the communication apparatus 1100 may be a terminal device, may be an in-vehicle communication apparatus, or an apparatus including the terminal device, for example, any type of vehicle, or an apparatus included in the terminal device, for example, a system chip. For example, the communication apparatus 1100 may alternatively be configured to implement the network device, a system chip in the network device, or the like in the foregoing embodiments. For example, the communication apparatus 1100 may include a corresponding module, unit, or means (means) for implementing the method operation in the foregoing embodiments. The module, the unit, or the means may be implemented by hardware or software, or may be implemented by hardware executing corresponding software. The hardware or the software includes one or more modules or units corresponding to the functions.

It should be understood that the communication apparatus 1100 may correspond to the terminal device in the methods 400, 600, 900, and 1000 according to embodiments of this application, and the communication apparatus 1100 may include a unit configured to perform the method that is performed by the terminal device and that is in the methods 400, 600, 900 and 1000 in the foregoing embodiments such as FIG. 4, FIG. 6, FIG. 9, and FIG. 10. The units in the communication apparatus 1100 and the foregoing other operations and/or functions are separately for implementing corresponding procedures of the methods 400, 600, 900, and 1000 in FIG. 4, FIG. 6, FIG. 9, and FIG. 10.

For example, when the communication apparatus 1100 is configured to perform the method 400 in FIG. 4, the transceiver unit 1120 may be configured to perform S410 in the method 400, and the processing unit 1110 may be configured to perform S420 in the method 400. When the communication apparatus 1100 is configured to perform the method 600 in FIG. 6, the transceiver unit 1120 may be configured to perform S610 in the method 600, and the processing unit 1110 may be configured to perform S620 in the method 600. It should be understood that a specific process in which the units perform the foregoing corresponding steps has been described in detail in the foregoing method embodiments. For brevity, details are not described herein again.

For example, the communication apparatus 1100 may correspond to the first terminal device in the embodiments in FIG. 9 and FIG. 10, or a chip disposed (or configured) in the first terminal device. The communication apparatus 1100 is configured to perform the method 900 in FIG. 9, the transceiver unit 1120 may be configured to perform S910 in the method 900, and the processing unit 1110 may be configured to perform S920 in the method 900. When the communication apparatus 1100 is configured to perform the method 1000 in FIG. 10, the transceiver unit 1120 may be configured to perform S1020, S1040, and S1050 in the method 1000, and the processing unit 1110 may be configured to perform S1030 and S1050 in the method 1000. It should be understood that a specific process in which the units perform the foregoing corresponding steps has been described in detail in the foregoing method embodiments. For brevity, details are not described herein again.

For example, the communication apparatus 1100 may correspond to the second terminal device in the embodiment in FIG. 10, or a chip disposed (or configured) in the second terminal device. The communication apparatus 1100 is configured to perform the method 1000 in FIG. 10, the transceiver unit 1120 may be configured to perform S1040 and S1050 in the method 1000, and the processing unit 1110 may be configured to perform S1050 in the method 1000. It should be understood that a specific process in which the units perform the foregoing corresponding steps has been described in detail in the foregoing method embodiments. For brevity, details are not described herein again.

Optionally, the communication apparatus 1100 may further include a storage unit. The storage unit may be configured to store instructions or data. The processing unit 1110 may execute the instructions or the data stored in the storage unit, so that the communication apparatus implements a corresponding operation, the transceiver unit 1120 in the communication apparatus 1100 may correspond to a transceiver 1210 in a terminal device 1200 shown in FIG. 12, and the storage unit may correspond to a memory in the terminal device 1200 shown in FIG. 12.

It should be understood that a specific process in which the units perform the foregoing corresponding steps has been described in detail in the foregoing method embodiments. For brevity, details are not described herein again.

Figure 12:
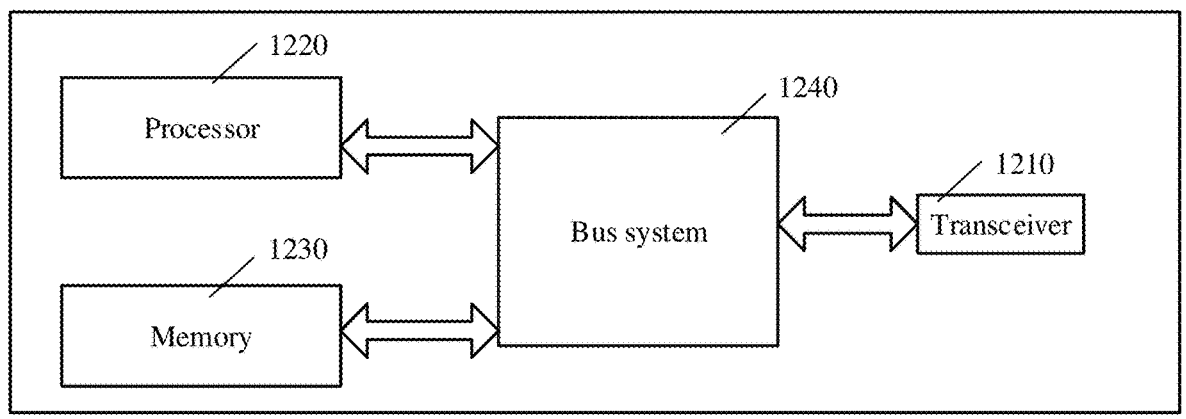
FIG. 12 is a schematic diagram of a structure of a terminal device according to this application.

It should be further understood that when the communication apparatus 1100 is the terminal device, the transceiver unit 1120 in the communication apparatus 1100 may be implemented by using a communication interface (for example, a transceiver or an input/output interface), for example, may correspond to the transceiver 1210 in the terminal device 1200 shown in FIG. 12. The processing unit 1110 in the communication apparatus 1100 may be implemented by using at least one processor, for example, may correspond to a processor 1220 in the terminal device 1200 shown in FIG. 12. The processing unit 1110 in the communication apparatus 1100 may be implemented by using at least one logic circuit. Optionally, the transceiver may be a transceiver circuit. Optionally, the input/output interface may be an input/output circuit.

It should be further understood that when the communication apparatus 1100 is the chip disposed (or configured) in the terminal device, the transceiver unit 1120 in the communication apparatus 1100 may be an input/output interface or circuit in the chip, and the processing unit 1110 in the communication apparatus 1100 may be a processor in the chip.

In another possible design, the communication apparatus 1100 may correspond to the network device in the foregoing method embodiments, or may be a chip disposed (or configured) in the network device.

It should be understood that the communication apparatus 1100 may correspond to the network device in the methods 400, 600, 900, and 1000 according to embodiments of this application, and the communication apparatus 1100 may include a unit configured to perform the method that is performed by the network device and that is in the methods 400, 600, 900 and 1000 in FIG. 4, FIG. 6, FIG. 9, and FIG. 10. The units in the communication apparatus 1100 and the foregoing other operations and/or functions are separately for implementing corresponding procedures of the methods 400, 600, 900, and 1000 in FIG. 4, FIG. 6, FIG. 9, and FIG. 10.

For example, when the communication apparatus 1100 is configured to perform the method 400 in FIG. 4, the transceiver unit 1120 may be configured to perform S410 in the method 400. When the communication apparatus 1100 is configured to perform the method 600 in FIG. 6, the transceiver unit 1120 may be configured to perform S610 in the method 600. When the communication apparatus 1100 is configured to perform the method 1000 in FIG. 10, the transceiver unit 1120 may be configured to perform S1020 in the method 1000, and the processing unit 1110 may be configured to perform S1010 in the method 1000. It should be understood that a specific process in which the units perform the foregoing corresponding steps has been described in detail in the foregoing method embodiments. For brevity, details are not described herein again.

Optionally, the communication apparatus 1100 may further include a storage unit. The storage unit may be configured to store instructions or data. The processing unit 1110 may execute the instructions or the data stored in the storage unit, so that the communication apparatus implements a corresponding operation, the transceiver unit 1120 in the communication apparatus 1100 may correspond to a transceiver 1310 in a network device 1300 shown in FIG. 13, and the storage unit may correspond to a memory in the network device 1300 shown in FIG. 13.

It should be understood that a specific process in which the units perform the foregoing corresponding steps has been described in detail in the foregoing method embodiments. For brevity, details are not described herein again.

Figure 13:
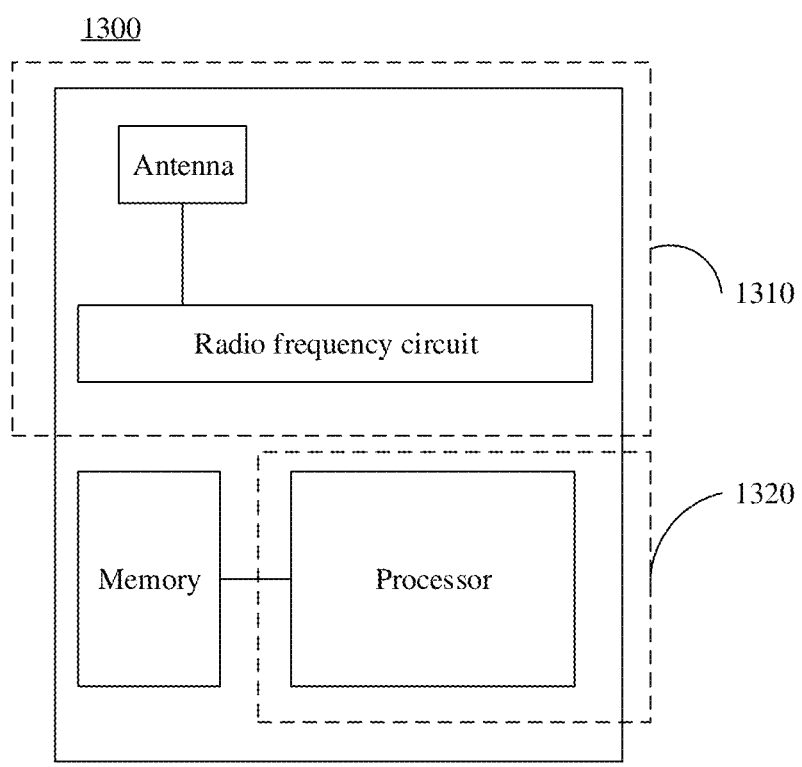
FIG. 13 is a schematic diagram of a structure of a network device according to this application.

It should be further understood that when the communication apparatus 1100 is the network device, the transceiver unit 1120 in the communication apparatus 1100 may be implemented by using a communication interface (for example, a transceiver or an input/output interface), for example, may correspond to the transceiver 1310 in the network device 1300 shown in FIG. 13. The processing unit 1110 in the communication apparatus 1100 may be implemented by using at least one processor, for example, may correspond to a processor 1320 in the network device 1300 shown in FIG. 13. The processing unit 1110 in the communication apparatus 1100 may be implemented by using at least one logic circuit. Optionally, the transceiver may be a transceiver circuit. Optionally, the input/output interface may be an input/output circuit.

It should be further understood that when the communication apparatus 1100 is the chip disposed (or configured) in the network device, the transceiver unit 1120 in the communication apparatus 1100 may be an input/output interface or circuit in the chip, and the processing unit 1110 in the communication apparatus 1100 may be a processor in the chip.

FIG. 12 is a schematic diagram of a structure of a terminal device 1200 according to an embodiment of this application. The terminal device 1200 may be used in the system shown in FIG. 1 or FIG. 2, to perform functions of the terminal device in the foregoing method embodiments. As shown in the figure, the terminal device 1200 includes a processor 1220 and a transceiver 1210. Optionally, the terminal device 1200 further includes a memory 1230. For example, the processor 1220, the transceiver 1210, and the memory 1230 may communicate with each other by using an internal connection path, to transmit a control signal and/or a data signal. The memory is configured to store a computer program. The processor 1220 is configured to execute the computer program in the memory 1230, to control the transceiver 1210 to send and receive a signal. Optionally, the terminal device 1200 may include a bus system 1240. Information may be transmitted between the transceiver 1210, the processor 1220, and the memory 1230 by using the bus system 1240.

The processor 1220 and the memory 1230 may be combined into one processing apparatus. The processor 1220 is configured to execute program code stored in the memory 1230 to implement the foregoing functions. In specific implementation, the memory may alternatively be integrated into the processor 1220, or may be independent of the processor 1220. The processor 1220 may correspond to the processing unit in FIG. 11.

The transceiver 1210 may correspond to the transceiver unit 1120 in FIG. 11. The transceiver 1210 may include a receiver (or referred to as a receiver machine or a receiver circuit) and a transmitter (or referred to as a transmitter machine or a transmitter circuit). For example, the receiver is configured to receive a signal, and the transmitter is configured to transmit a signal.

It should be understood that the terminal device 1200 shown in FIG. 12 can implement processes related to the terminal device in the method embodiments shown in FIG. 4, FIG. 6, FIG. 9, and FIG. 10. Operations and/or functions of the modules in the terminal device 1200 are separately used to implement corresponding procedures in the foregoing method embodiments. For details, refer to descriptions in the foregoing method embodiments. To avoid repetition, detailed descriptions are properly omitted herein.

The processor 1220 may be configured to perform an action that is implemented inside the terminal device and that is described in the foregoing method embodiments, and the transceiver 1210 may be configured to perform an action of sending to the network device by the terminal device or receiving from the network device by the terminal device described in the foregoing method embodiments. For details, refer to the descriptions in the foregoing method embodiments. Details are not described herein again.

Optionally, the terminal device 1200 may further include a power supply, configured to supply power to various components or circuits in the terminal device.

In addition, to improve the functions of the terminal device, the terminal device 1200 may further include one or more of an input unit, a display unit, an audio circuit, a camera, a sensor, and the like. The audio circuit may further include a speaker, a microphone, and the like.

FIG. 13 is a schematic diagram of a structure of a network device 1300 according to an embodiment of this application. The network device 1300 may be used in the system shown in FIG. 1 or FIG. 2, to perform functions of the network device in the foregoing method embodiments. As shown in the figure, the network device 1300 includes a processor 1320 and a transceiver 1310. Optionally, the network device 1300 further includes a memory. For example, the processor 1320, the transceiver 1310, and the memory may communicate with each other by using an internal connection path, to transmit a control signal and/or a data signal. The memory is configured to store a computer program. The processor 1320 is configured to execute the computer program in the memory, to control the transceiver 1310 to send and receive a signal. Optionally, the transceiver 1310 in the network device 1300 may include an antenna and/or a radio frequency circuit.

It should be understood that the network device 1300 shown in FIG. 13 can implement processes related to the network device in the method embodiments shown in FIG. 4, FIG. 6, FIG. 9, and FIG. 10. Operations and/or functions of the modules in the network device 1300 are separately used to implement corresponding procedures in the foregoing method embodiments. For details, refer to descriptions in the foregoing method embodiments. To avoid repetition, detailed descriptions are properly omitted herein.

It should be understood that the network device 1300 shown in FIG. 13 is merely a possible architecture of the network device, and should not constitute any limitation on this application. The methods provided in this application may be applicable to a network device in another architecture, for example, a network device including a CU, a DU, and an AAU. A specific architecture of the network device is not limited in this application.

Embodiments of this application further provide a processing apparatus, including a processor and a memory. The processor is configured to read instructions stored in the memory, receive a signal by using a receiver, and transmit a signal by using a transmitter, to perform the method in any one of the foregoing method embodiments.

It should be understood that the foregoing processing apparatus may be one or more chips. For example, the processing apparatus may be a field programmable gate array (FPGA), may be an application-specific integrated circuit (ASIC), may be a system on chip (SoC), may be a central processing unit (CPU), may be a network processor (NP), may be a digital signal processing circuit (DSP), may be a micro controller unit (MCU), may be a programmable controller (PLD), or another integrated chip.

In an implementation process, steps in the foregoing methods may be implemented by using an integrated logical circuit of hardware in the processor, or by using instructions in a form of software. The steps of the methods disclosed with reference to embodiments of this application may be directly performed and completed by a hardware processor, or may be performed and completed by using a combination of the hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

It should be noted that the processor in embodiments of this application may be an integrated circuit chip and has a signal processing capability. In an implementation process, steps in the foregoing method embodiments may be implemented by using an integrated logical circuit of hardware in the processor, or by using instructions in a form of software. The processor may be a general-purpose processor, a digital signal processor (DSP), an application-specific integrated circuit (ASIC), a field programmable gate array (FPGA) or another programmable logic device, a discrete gate, transistor logic device, or a discrete hardware component. The processor may implement or perform the methods, the steps, and the logical block diagrams disclosed in embodiments of this application. The general-purpose processor may be a microprocessor, or the processor may be any conventional processor, or the like. The steps of the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor.

It should be understood that the memory mentioned in embodiments of this application may be a volatile memory, a nonvolatile memory, or may include both. For example, the nonvolatile memory may be a read-only memory (ROM), a programmable read-only memory (PROM), or an erasable programmable read-only memory (EPROM), electrically erasable programmable read-only memory (EEPROM), or a flash memory. The volatile memory may be a random access memory (RAM) that is used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification is intended to include but is not limited to these memories and any memory of another proper type.

According to the methods provided in embodiments of this application, this application further provides a computer program product. The computer program product includes computer program code. When the computer program code is executed by one or more processors, an apparatus including the processor is enabled to perform the methods in embodiments shown in FIG. 4, FIG. 6, FIG. 9, and FIG. 10.

According to the methods provided in embodiments of this application, this application further provides a computer-readable storage medium. The computer-readable storage medium stores program code. When the program code is run by one or more processors, an apparatus including the processor is enabled to perform the methods in embodiments shown in FIG. 4, FIG. 6, FIG. 9, and FIG. 10.

According to the methods provided in embodiments of this application, this application further provides a system, including the foregoing one or more network devices. The system may further include the foregoing one or more terminal devices.

The network device and the terminal device in the foregoing apparatus embodiments completely correspond to the network device or the terminal device in the method embodiments, and a corresponding module or unit performs a corresponding step. For example, a communication unit (a transceiver) performs a sending or receiving step in the method embodiments, and another step other than sending and receiving may be performed by a processing unit (a processor). For a function of a specific unit, refer to a corresponding method embodiment. For example, there may be one or more processors.

All or a part of the foregoing embodiments may be implemented through software, hardware, firmware, or any combination thereof. When the software is used to implement the embodiments, all or a part of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device or the terminal device in the method embodiments, and a corresponding module or unit performs a corresponding step. For example, a communication unit (a transceiver) performs a sending or receiving step in the method embodiments, and another step other than sending and receiving may be performed by a processing unit (a processor). For a function of a specific unit, refer to a corresponding method embodiment. There may be one or more processors.

Terms such as a "component", a "module", and a "system" used in this specification indicate computer-related entities, hardware, firmware, combinations of hardware and software, software, or software being executed. For example, a component may be but is not limited to a process running on a processor, a processor, an object, an executable file, an execution thread, a program, and/or a computer. As shown in the figures, both an application running on a computing device and the computing device may be components. One or more components may reside within a process and/or an execution thread, and a component may be located on one computer and/or distributed between two or more computers. In addition, these components may be executed from various computer-readable media on which various data structures are stored. The components may communicate, for example, by using a local and/or remote process, based on a signal having one or more data packets (for example, data from two components interacting with another component in a local system, a distributed system, and/or a network, for example, the internet interacting with another system by using a signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic, a mechanical, or another form.

The units described as separate parts may or may not be physically separate, and parts displayed as units may or may not be physical units, may be located in one position, or may be distributed on a plurality of network units. A part of or all of the units may be selected based on an actual need, to achieve the objectives of the solutions of the embodiments.

In addition, functional units in embodiments of this application may be integrated into one processing unit, each of the units may exist alone physically, or two or more units may be integrated into one unit.

In the foregoing embodiments, all or a part of functions of the functional units may be implemented through software, hardware, firmware, or any combination thereof. When the software is used to implement the embodiments, all or a part of the embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software functional unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
receiving, by a terminal device, first information sent by a network device, wherein the first information comprises a first offset, the first offset is a difference between a frame number of a first system frame and a frame number of a first direct frame, and the first system frame and the first direct frame overlap in a time domain; and
determining, by the terminal device, the first direct frame based on at least one of the first offset or the frame number of the first system frame.

2. The wireless communication method according to claim 1, wherein the first offset, the frame number of the first system frame, and the frame number of the first direct frame satisfy:

$$D_f=(N_{max}+1+S_f-\Delta 1) \bmod (N_{max}+1), \text{wherein}$$

$D_f$ is the frame number of the first direct frame, $S_f$ is the frame number of the first system frame, $\Delta 1$ is the first offset, and $N_{max}$ is a maximum value of the frame number of the first direct frame.

3. The wireless communication method according to claim 1, further comprising:
receiving, by the terminal device, second information sent by the network device, wherein the second information is used to configure a discontinuous reception (DRX) operation on a sidelink of the terminal device, and the second information is determined by the network device based on the frame number of the first system frame; and
determining, by the terminal device, third information of the DRX operation based on the second information and the first offset, wherein the third information is configuration information of the DRX operation corresponding to the frame number of the first direct frame.

4. The wireless communication method according to claim 3, wherein the terminal device is a first terminal device, and the method further comprises:
sending, by the first terminal device, the third information to a second terminal device, wherein the DRX operation is used by the first terminal device to send or receive a signal between the first terminal device and the second terminal device.

5. An apparatus, comprising:
at least one processor; and
a memory having instructions stored thereon that, when executed by the at least one processor, cause the apparatus to:
receive first information sent by a network device, wherein the first information comprises a first offset, the first offset is a difference between a frame number of a first system frame and a frame number of a first direct frame, and the first system frame and the first direct frame overlap in a time domain; and
determine the first direct frame based on at least one of the first offset or the frame number of the first system frame.

6. The apparatus according to claim 5, wherein the first offset, the frame number of the first system frame, and the frame number of the first direct frame satisfy:

$$D_f=(N_{max}+1+S_f-\Delta 1) \bmod (N_{max}+1), \text{wherein}$$

$D_f$ is the frame number of the first direct frame, $S_f$ is the frame number of the first system frame, $\Delta 1$ is the first offset, and $N_{max}$ is a maximum value of the frame number of the first direct frame.

7. The apparatus according to claim 5, wherein the apparatus is further caused to:
receive second information sent by the network device, wherein the second information is used to configure a discontinuous reception (DRX) operation on a sidelink of the apparatus, and the second information is determined by the network device based on the frame number of the first system frame; and
determine third information of the DRX operation based on the second information and the first offset, wherein the third information is configuration information of the DRX operation corresponding to the frame number of the first direct frame.

8. The apparatus according to claim 7, wherein the apparatus is a first terminal device, and the apparatus is further caused to:
send the third information to a second terminal device, wherein the DRX operation is used to send or receive a signal between the apparatus and the second terminal device.

9. An apparatus, comprising:
at least one processor; and
a memory having instructions stored thereon that, when executed by the at least one processor, cause the apparatus to:
determine a first offset, wherein the first offset is a difference between a frame number of a first system frame and a frame number of a first direct frame, and the first system frame and the first direct frame at least partially overlap in a time domain; and
send first information to a terminal device, wherein the first information comprises the first offset.

10. The apparatus according to claim 9, wherein a unit of the first offset is one or more of the following units: a frame, a subframe, a symbol, a millisecond ms, or a microsecond μs.

11. The apparatus according to claim 9, wherein the apparatus is further caused to:
send second information to the terminal device, wherein the second information is used to configure a discontinuous reception operation on a sidelink of the terminal device, and the second information is determined based on the frame number of the first system frame.

12. The apparatus according to claim 9, wherein the first system frame and the first direct frame completely overlap in the time domain.

13. The wireless communication method according to claim 1, wherein the first system frame and the first direct frame partially overlap in the time domain.

14. The wireless communication method according to claim 1, wherein the first system frame and the first direct frame completely overlap in the time domain.

15. The wireless communication method according to claim 1, wherein the first direct frame is based on the first offset and the frame number of the first system frame.

16. The wireless communication method according to claim 1, wherein the first offset, the frame number of the first system frame, and the frame number of the first direct frame satisfy:

$$D_f = (N_{max}+1+S_f+\Delta 1) \bmod (N_{max}+1), \text{ wherein}$$

$D_f$ is the frame number of the first direct frame, $S_f$ is the frame number of the first system frame, $\Delta 1$ is the first offset, and $N_{max}$ is a maximum value of the frame number of the first direct frame.

17. The apparatus according to claim 5, wherein the first system frame and the first direct frame partially overlap in the time domain.

18. The apparatus according to claim 5, wherein the first system frame and the first direct frame completely overlap in the time domain.

19. The apparatus according to claim 5, wherein the first direct frame is based on the first offset and the frame number of the first system frame.

20. The apparatus according to claim 5, wherein the first offset, the frame number of the first system frame, and the frame number of the first direct frame satisfy:

$$D_f = (N_{max}+1+S_f+\Delta 1) \bmod (N_{max}+1), \text{ wherein}$$

$D_f$ is the frame number of the first direct frame, $S_f$ is the frame number of the first system frame, $\Delta 1$ is the first offset, and $N_{max}$ is a maximum value of the frame number of the first direct frame.

* * * * *